(12) United States Patent
Kimura

(10) Patent No.: US 12,360,349 B2
(45) Date of Patent: Jul. 15, 2025

(54) ZOOM LENS AND IMAGE PICKUP APPARATUS HAVING THE SAME

(71) Applicant: CANON KABUSHIKI KAISHA, Tokyo (JP)

(72) Inventor: Kohei Kimura, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 253 days.

(21) Appl. No.: 18/147,901

(22) Filed: Dec. 29, 2022

(65) Prior Publication Data

US 2023/0213742 A1 Jul. 6, 2023

(30) Foreign Application Priority Data

Jan. 1, 2022 (JP) ................................. 2022-000016

(51) Int. Cl.
*G02B 15/14* (2006.01)
*G02B 15/177* (2006.01)

(52) U.S. Cl.
CPC ............... *G02B 15/144507* (2019.08); *G02B 15/143503* (2019.08); *G02B 15/145507* (2019.08); *G02B 15/177* (2013.01)

(58) Field of Classification Search
CPC .... G02B 15/143501; G02B 15/143503; G02B 15/144501; G02B 15/144503; G02B 15/144505; G02B 15/144507; G02B 15/145501; G02B 15/145503; G02B 15/145505; G02B 15/145507; G02B 15/145509; G02B 15/145511; G02B 15/145513; G02B 15/145515; G02B 15/1465

See application file for complete search history.

(56) References Cited

U.S. PATENT DOCUMENTS

| | | | |
|---|---|---|---|
| 2015/0054989 A1* | 2/2015 | Masui | G02B 15/144515 359/680 |
| 2015/0253550 A1* | 9/2015 | Hosoi | G02B 15/144507 359/686 |
| 2018/0314060 A1* | 11/2018 | Sakamoto | G02B 15/1455 |
| 2019/0369371 A1* | 12/2019 | Katou | G02B 15/145515 |
| 2021/0132346 A1* | 5/2021 | Kitada | G02B 27/0025 |
| 2021/0149168 A1* | 5/2021 | Uehara | G03B 5/00 |
| 2021/0247597 A1* | 8/2021 | Akashi | G02B 15/20 |
| 2023/0101126 A1* | 3/2023 | Ohtake | G02B 15/145511 359/683 |

FOREIGN PATENT DOCUMENTS

| | | |
|---|---|---|
| JP | 5110128 A | 12/2012 |
| JP | 2020-042221 A | 3/2020 |

\* cited by examiner

*Primary Examiner* — Darryl J Collins
(74) *Attorney, Agent, or Firm* — Canon U.S.A., Inc. IP Division

(57) ABSTRACT

A zoom lens includes a plurality of lens units. The plurality of lens units consist of, in order from an object side to an image side, a first lens unit having a negative refractive power, a middle group including one or more lens units, and a final lens unit having a negative refractive power. Each distance between adjacent lens units changes during zooming. The first lens unit includes at least three negative lenses. Predetermined conditions are satisfied.

22 Claims, 11 Drawing Sheets

ZOOM LENS AND IMAGE PICKUP APPARATUS HAVING THE SAME

BACKGROUND

Technical Field

An aspect of embodiments relates to a zoom lens that is suitable for digital video cameras, digital still cameras, broadcasting cameras, silver-halide film cameras, monitoring cameras, and the like.

Description of the Related Art

In recent years, it has been required that a zoom lens used in an image pickup apparatus has a wide angle of view and high optical performance as functions of image pickup apparatuses have improved. As a zoom lens having a wide angle at a wide-angle end, a negative lead type zoom lens is known in which a lens unit having a negative refractive power is disposed on a front side.

As a negative lead type zoom lens, Japanese Patent No. ("JP") 5110128 discloses a zoom lens consisting of a first lens unit and a second lens unit having negative and positive refractive powers in order from an object side to an image side. Further, Japanese Patent Laid-Open No. ("JP-A") 2020-042221 discloses a mirrorless type zoom lens consisting of first to fourth lens units having negative, positive, positive, and positive refractive powers in order from an object side to an image side.

However, in the zoom lens disclosed in JP 5110128, a focal length of the first lens unit is set small for a purpose of widening of an angle of view, and therefore a distortion amount is large at a wide-angle end and a peripheral image is degraded. Moreover, a back focus and the refractive power of the first lens unit are not appropriate, and it is difficult to further reduce a front lens diameter and an overall length. The zoom lens disclosed in JP-A 2020-042221 has a short back focus and a refractive power arrangement suitable for reduction of overall length. However, all lens units subsequent to the first lens unit (subsequent group) have positive refractive powers, and it is difficult to bring a front principal point position of the entire subsequent group to the first lens unit side. Thus, it is difficult to further reduce the size and weight.

When a small and light zoom lens having high optical performance over an entire zoom range is to be acquired while an angle of view is widened, it is important to properly set a refractive power and a lens configuration of a first lens unit and refractive powers and arrangement positions of lens units subsequent to the first lens unit (subsequent group).

SUMMARY

A zoom lens according to one aspect of the embodiments includes a plurality of lens units. The plurality of lens units consist of, in order from an object side to an image side, a first lens unit having a negative refractive power, a middle group including one or more lens units, and a final lens unit having a negative refractive power. Each distance between adjacent lens units changes during zooming. The first lens unit includes at least three negative lenses. The following inequalities are satisfied.

$$0.6 < TD1^2/(f1 \times fr) < 10.0$$

$$-10.0 < (mr-mf)/fw < -0.1$$

$$1.0 < (R2+R1)/(R2-R1) < 10.0$$

TD1 represents a thickness on an optical axis of the first lens unit. f1 represents a focal length of the first lens unit. fr represents a focal length of the final lens unit. mr represents a moving amount of the final lens unit during zooming from a wide-angle end to a telephoto end. mf represents a moving amount of a lens unit next to the final lens unit on the object side during zooming from the wide-angle end to the telephoto end. fw represents a focal length of the zoom lens at the wide-angle end. R1 represents a curvature radius of an object-side lens surface of a lens closest to an image in the final lens unit. and R2 represents a curvature radius of an image-side lens surface of the lens closest to the image in the final lens unit.

An image pickup apparatus according to one aspect of the embodiments includes a zoom lens and a sensor. The sensor is configured to receive light of an image formed by the zoom lens.

A system according to one aspect of the embodiments includes a zoom lens and at least one processor. The at least one processor or circuit is configured to execute a plurality of tasks including a controlling task configured to control the zoom lens during zooming.

Further features of the disclosure will become apparent from the following description of exemplary embodiments with reference to the attached drawings.

DESCRIPTION OF THE EMBODIMENTS

With reference to the accompanying drawings, a description is given of embodiments of a zoom lens and an image pickup apparatus having the zoom lens according to the present disclosure.

Figure 1:
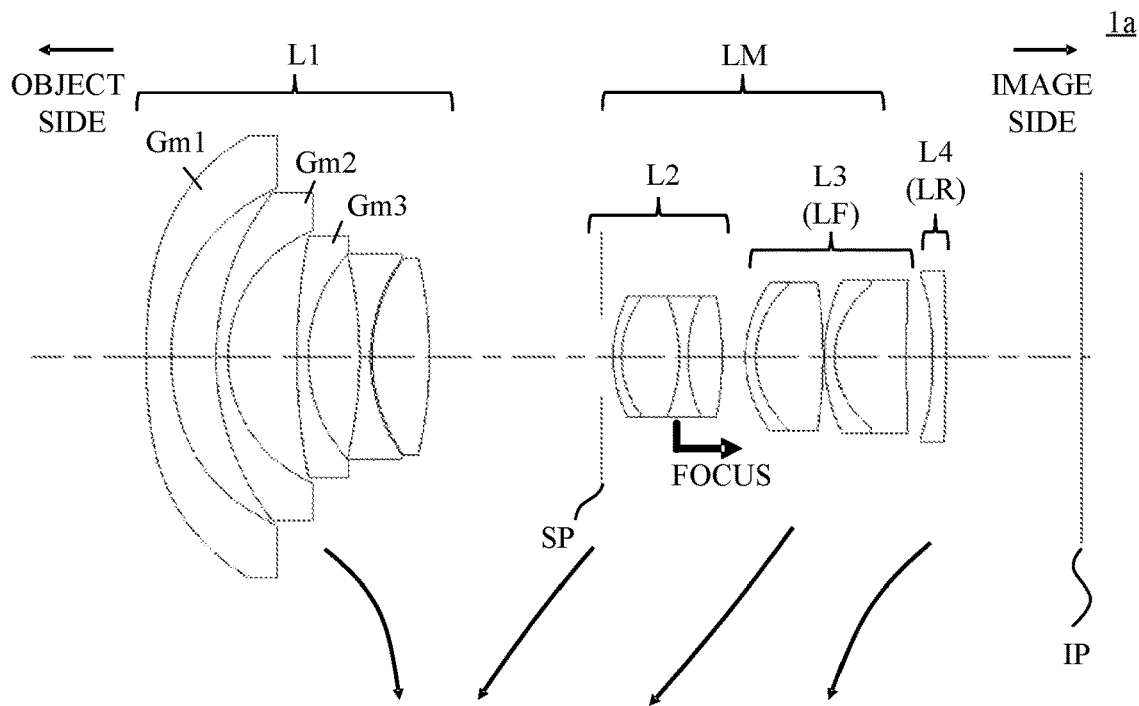
FIG. 1 is a sectional view of a zoom lens at a wide-angle end according to Example 1.
Figure 2A:
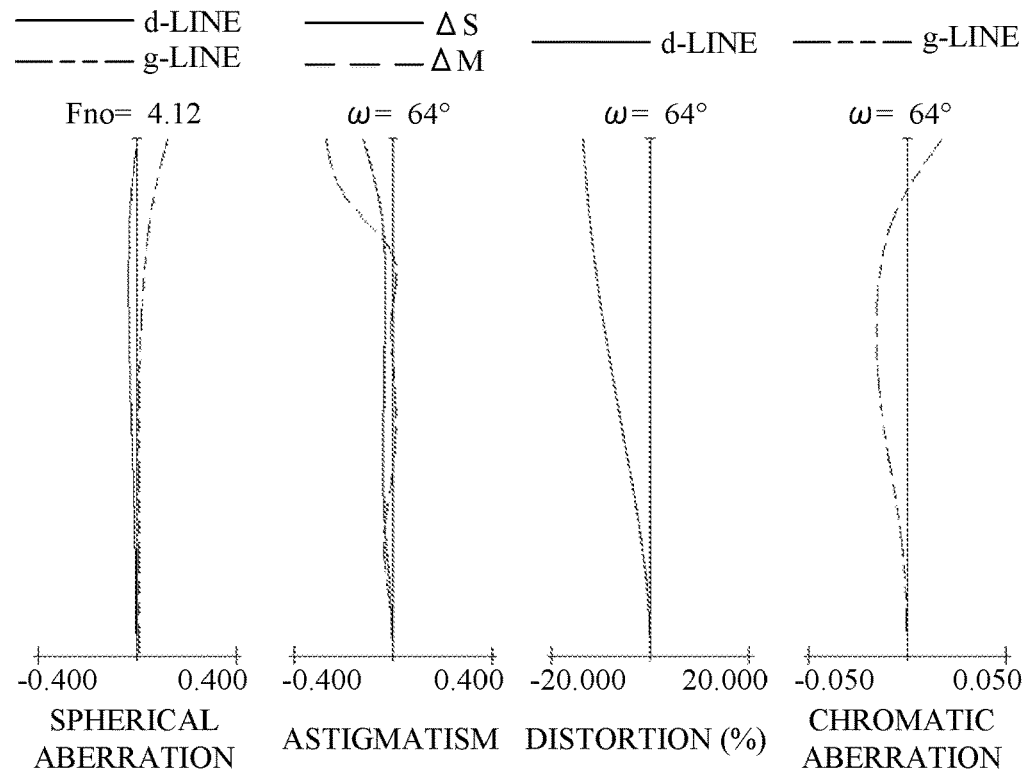
FIGS. 2A to 2C are aberration diagrams of the zoom lens at (A) the wide-angle end, (B) a middle zoom position, and (C) a telephoto end according to Example 1.
Figure 2B:
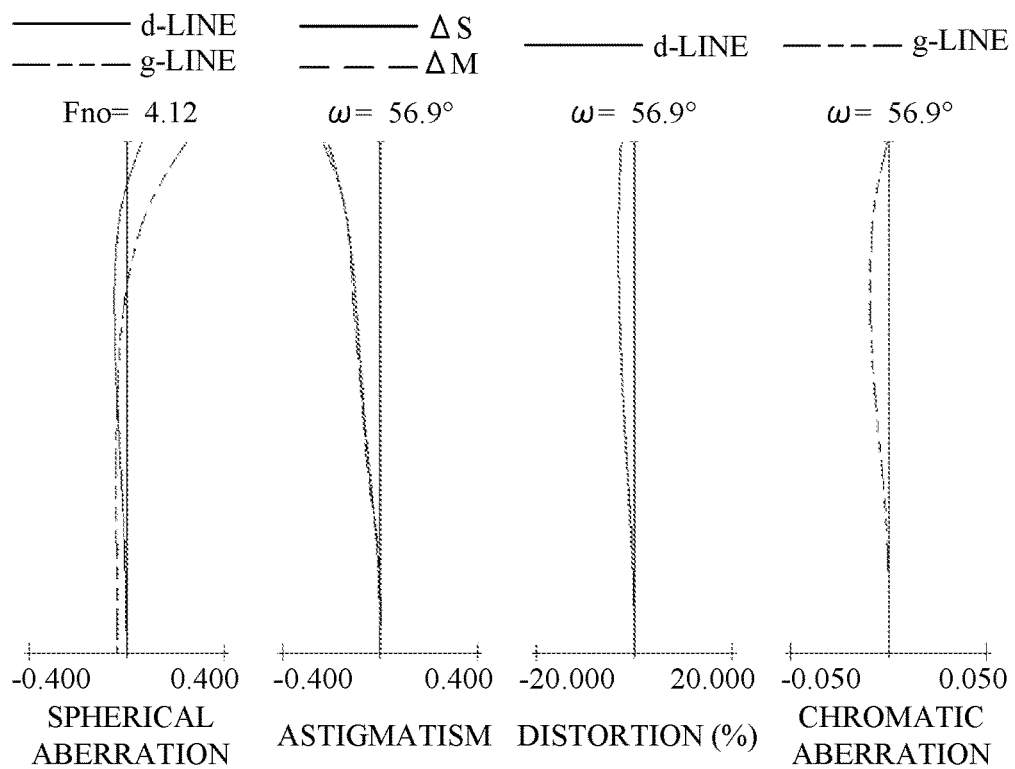
Figure 2C:
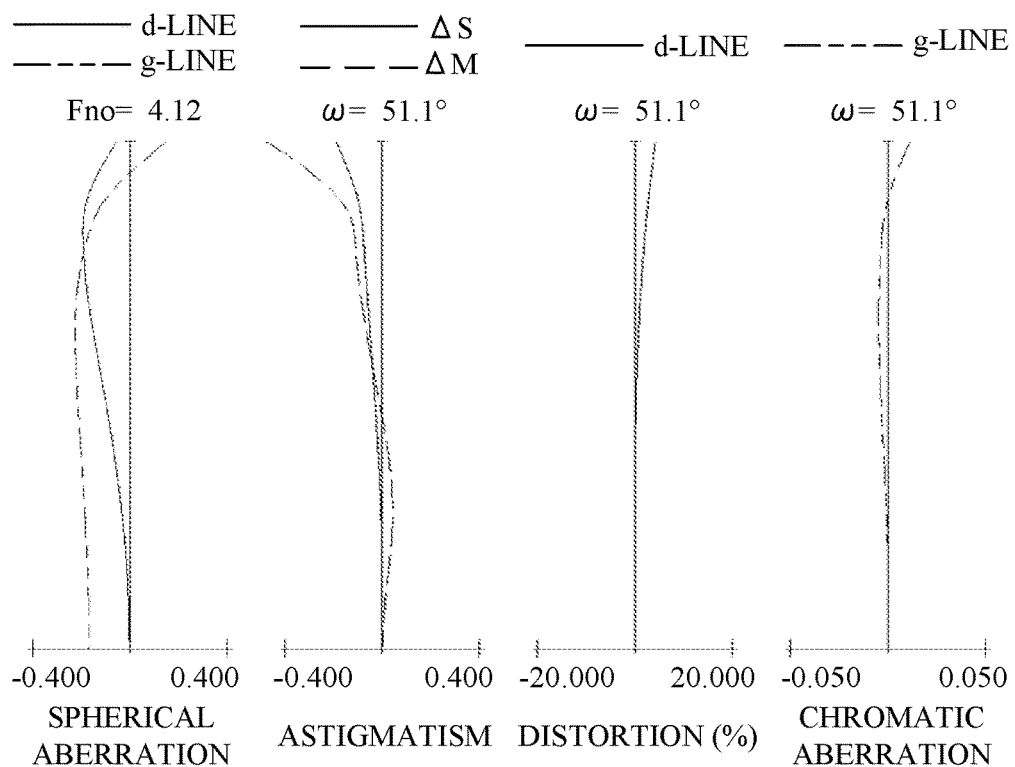

FIG. 1 is a sectional view of a zoom lens 1a at a wide-angle end according to Example 1. FIGS. 2A, 2B, and 2C are longitudinal aberration diagrams of the zoom lens 1a at the wide-angle end, a middle zoom position, and a telephoto end, respectively. The zoom lens 1a has a zoom ratio of about 1.9 times and an F-number of about 4.12. The zoom lens 1a has an overall angle of view of 128 degrees at the wide-angle end and 102 degrees at the telephoto end.

Figure 3:
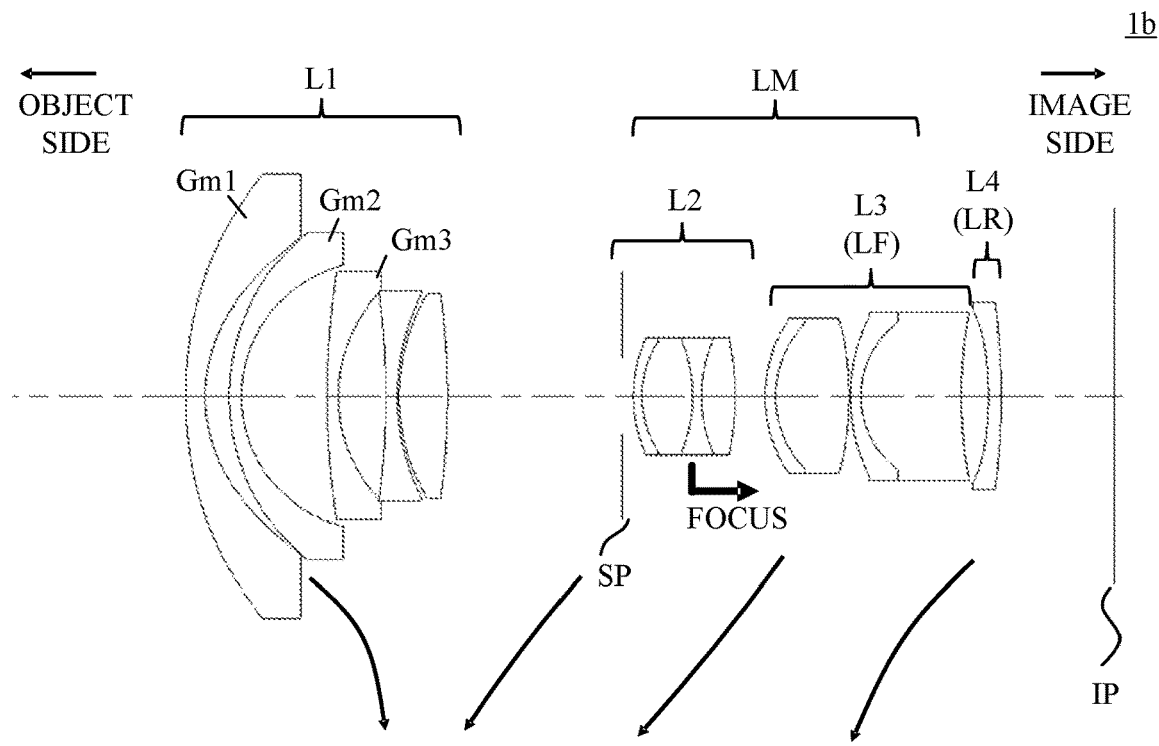
FIG. 3 is a sectional view of a zoom lens at a wide-angle end according to Example 2.
Figure 4A:
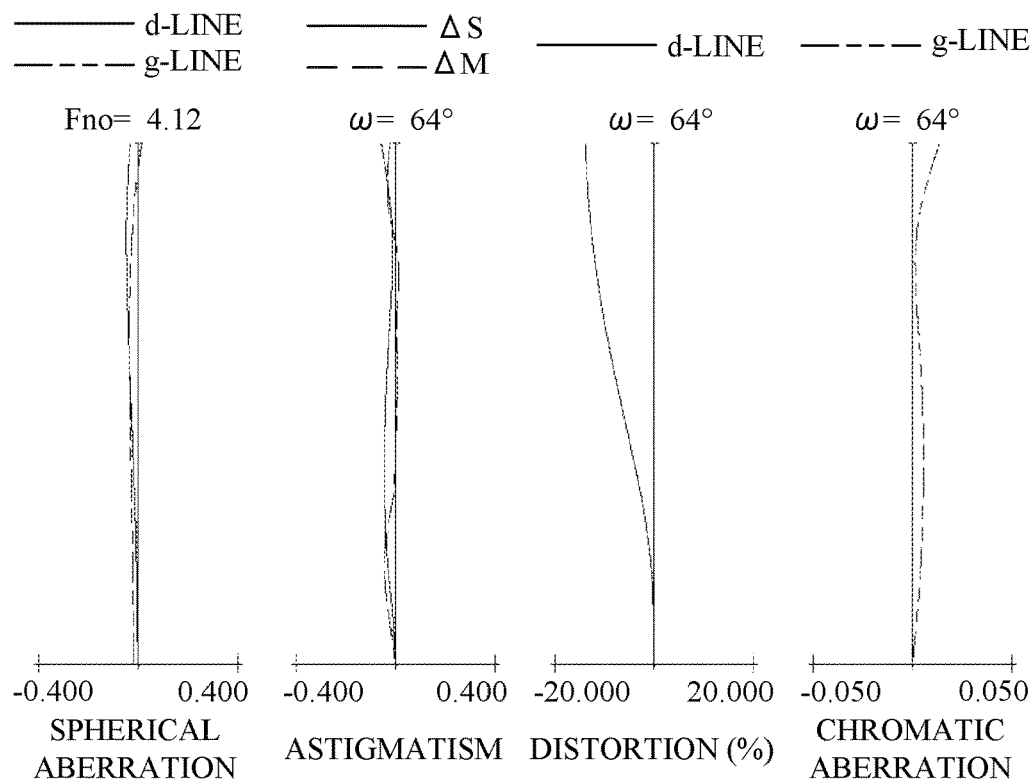
FIGS. 4A to 4C are aberration diagrams of the zoom lens at (A) the wide-angle end, (B) a middle zoom position, and (C) a telephoto end according to Example 2.
Figure 4B:
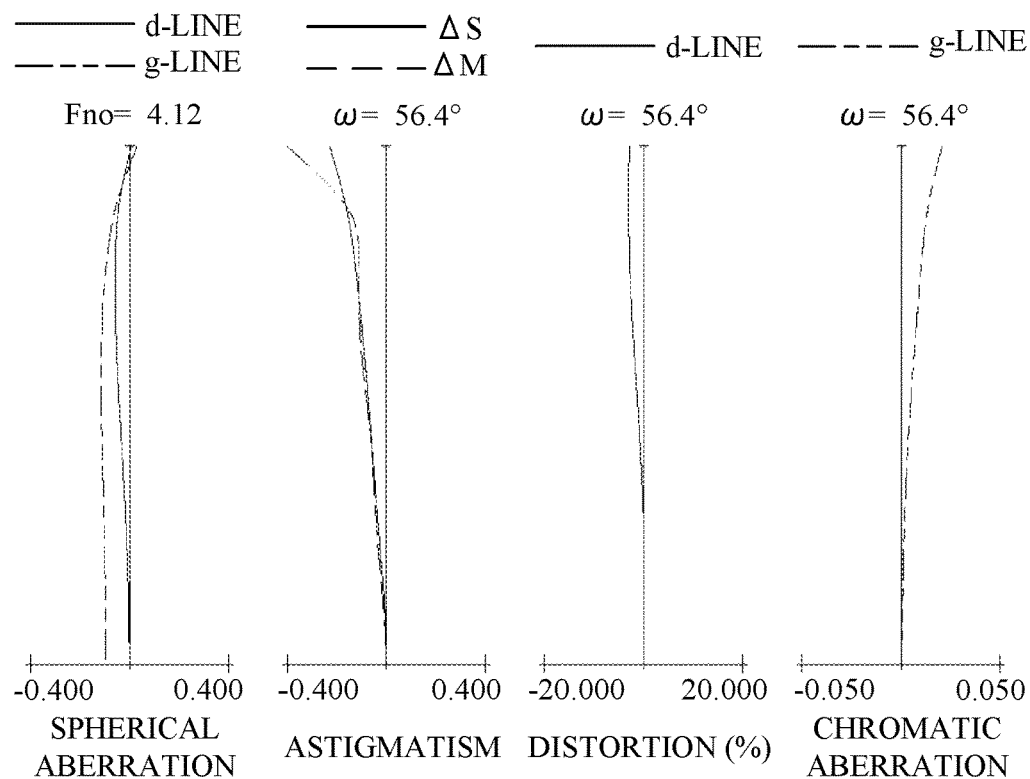
Figure 4C:
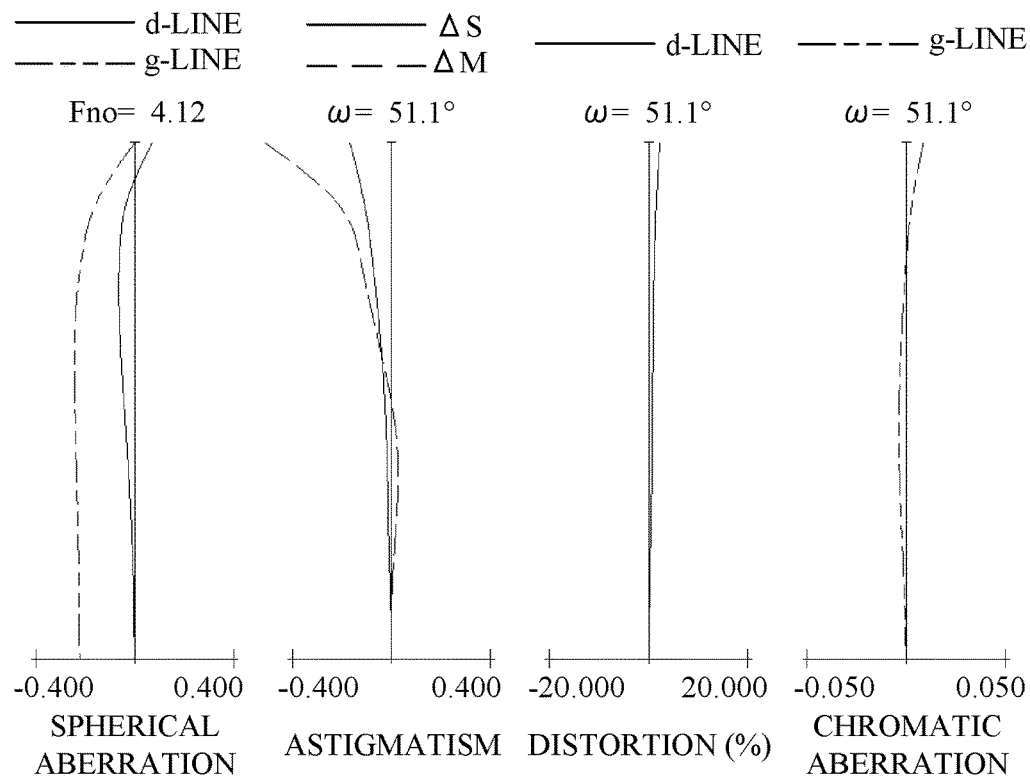

FIG. 3 is a sectional view of a zoom lens 1b at a wide-angle end according to Example 2. FIGS. 4A, 4B, and 4C are longitudinal aberration diagrams of the zoom lens 1b at the wide-angle end, a middle zoom position, and a telephoto end, respectively. The zoom lens 1b has a zoom ratio of about 1.9 times and an F-number of about 4.12. The zoom lens 1b has an overall angle of view of 128 degrees at the wide-angle end and 102 degrees at the telephoto end.

Figure 5:
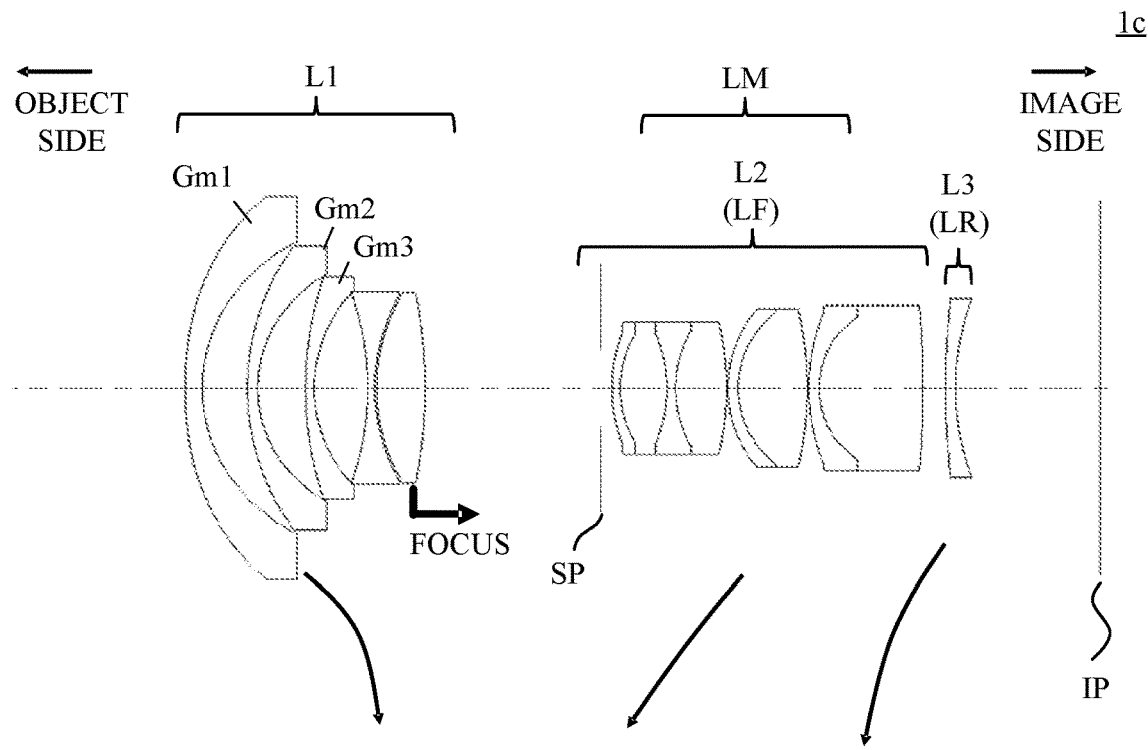
FIG. 5 is a sectional view of a zoom lens at a wide-angle end according to Example 3.
Figure 6A:
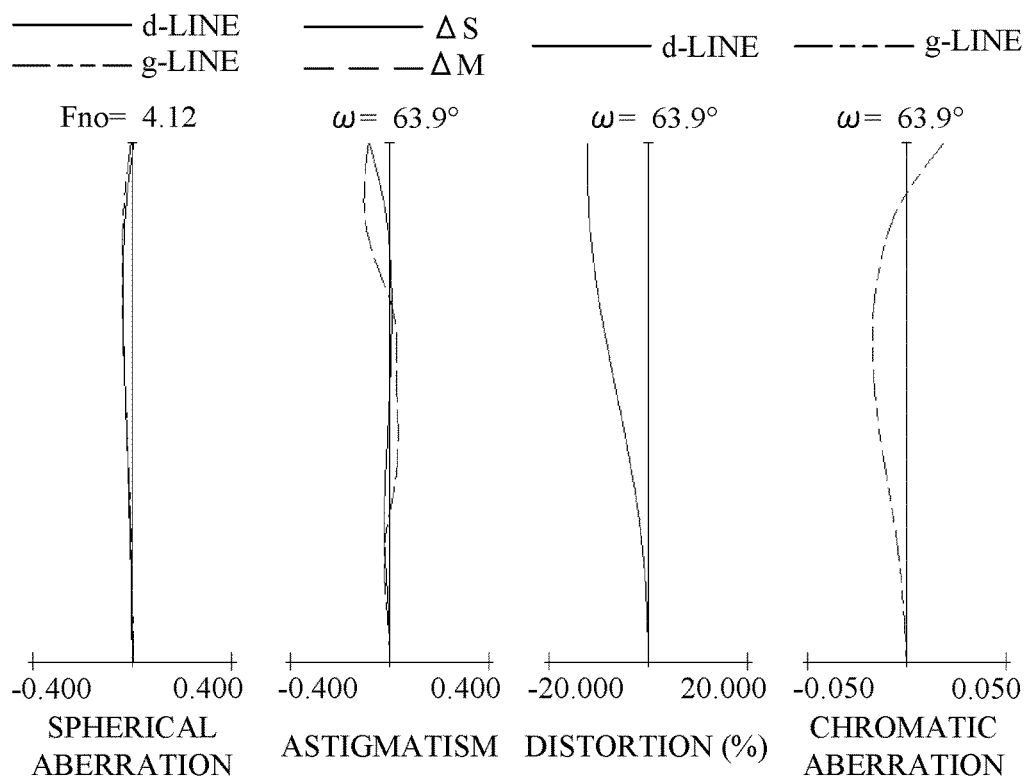
FIGS. 6A to 6C are aberration diagrams of the zoom lens at (A) the wide-angle end, (B) a middle zoom position, and (C) a telephoto end according to Example 3.
Figure 6B:
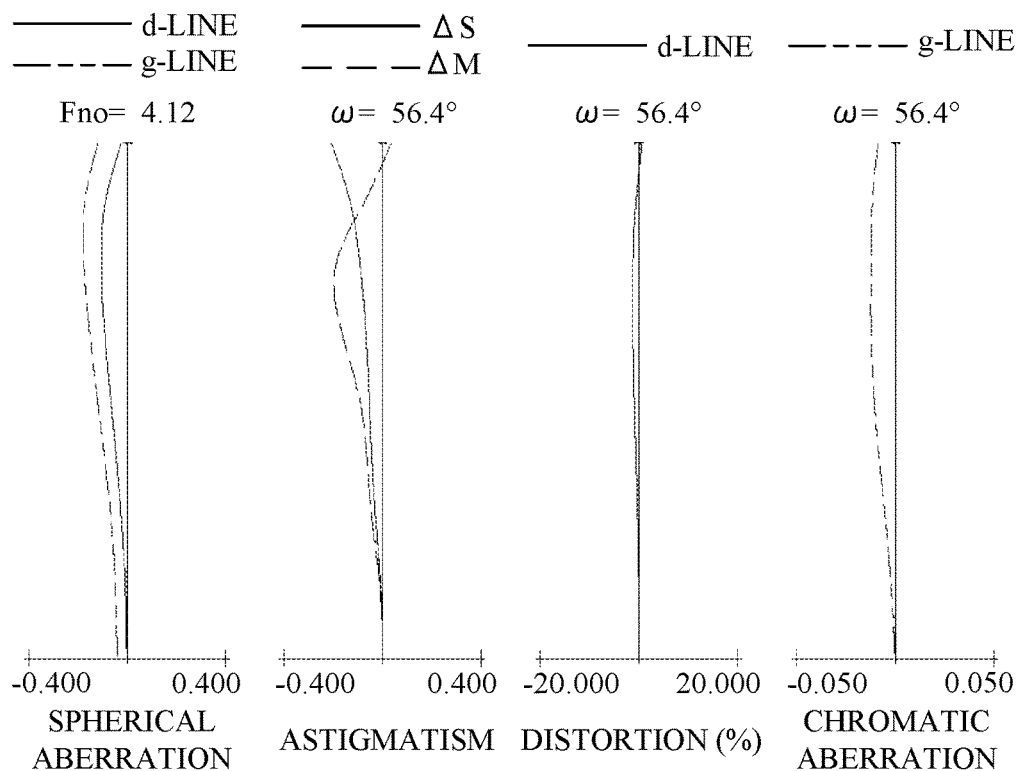
Figure 6C:
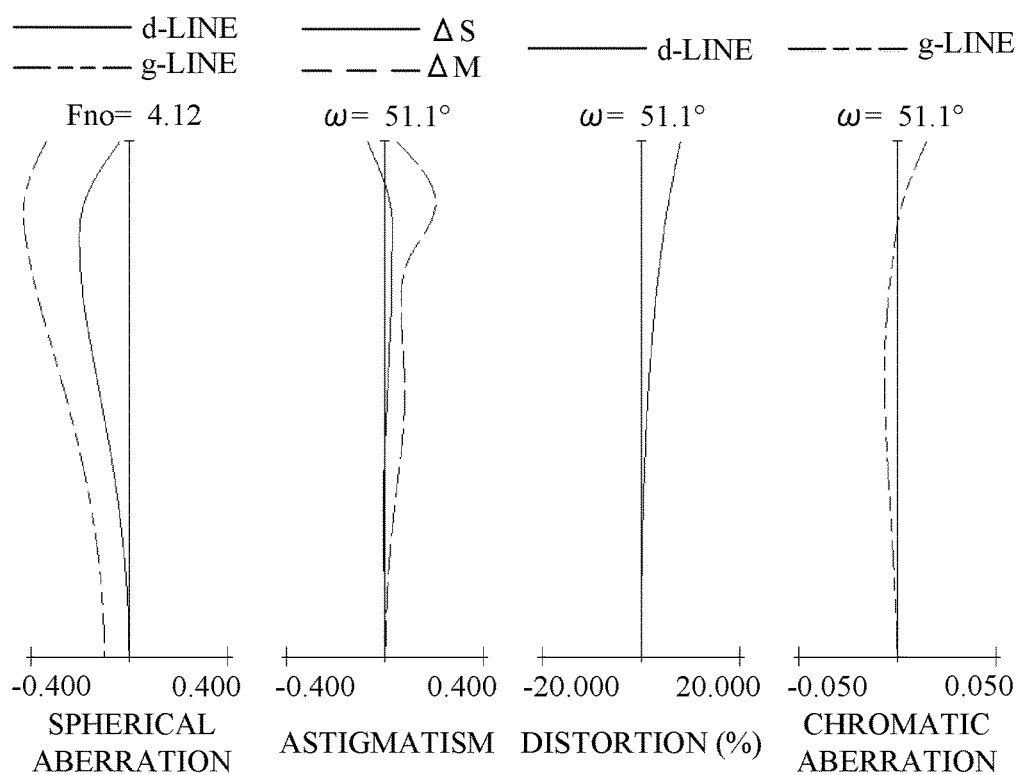

FIG. 5 is a sectional view of a zoom lens 1c at a wide-angle end according to Example 3. FIGS. 6A, 6B, and 6C are longitudinal aberration diagrams of the zoom lens 1c at the wide-angle end, a middle zoom position, and a telephoto end, respectively. The zoom lens 1c has a zoom ratio of about 1.9 times and an F-number of about 4.12. The zoom lens 1c has an overall angle of view of 134 degrees at the wide-angle end and 102 degrees at the telephoto end.

Figure 7:
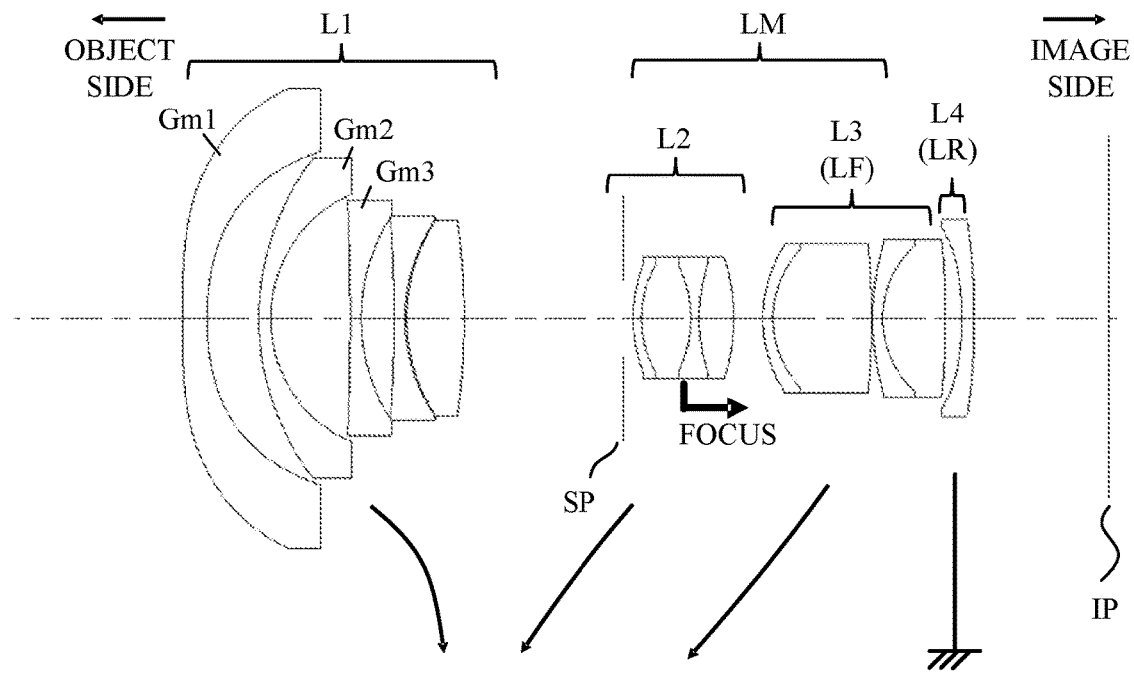
FIG. 7 is a sectional view of a zoom lens at a wide-angle end according to Example 4.
Figure 8A:
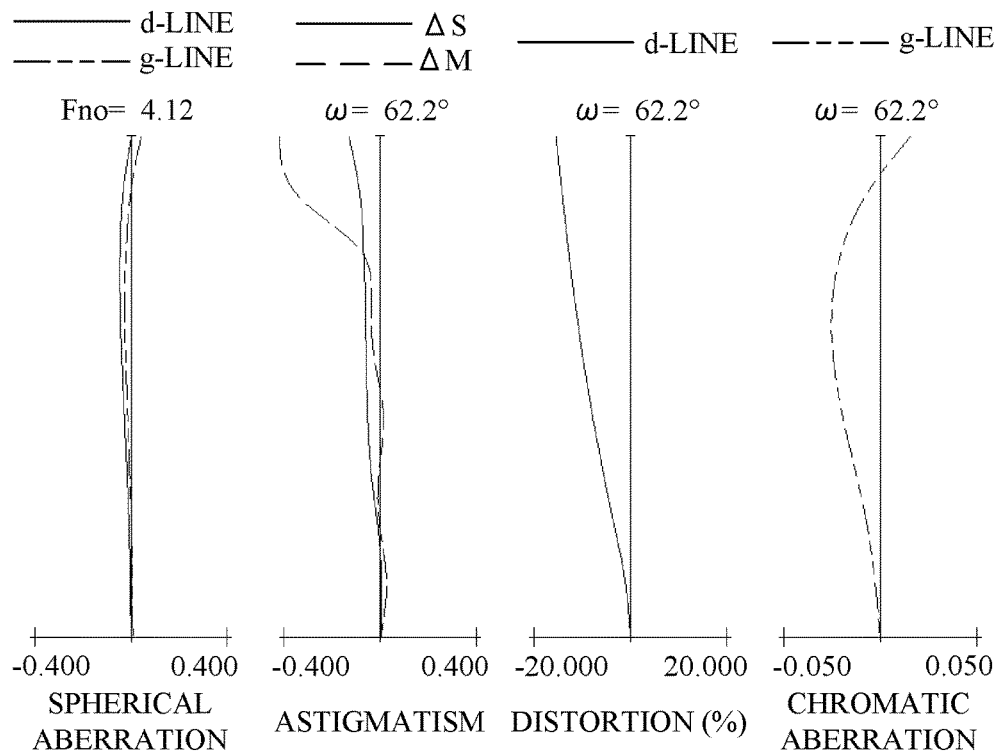
FIGS. 8A to 8C are aberration diagrams of the zoom lens at (A) the wide-angle end, (B) a middle zoom position, and (C) a telephoto end according to Example 4.
Figure 8B:
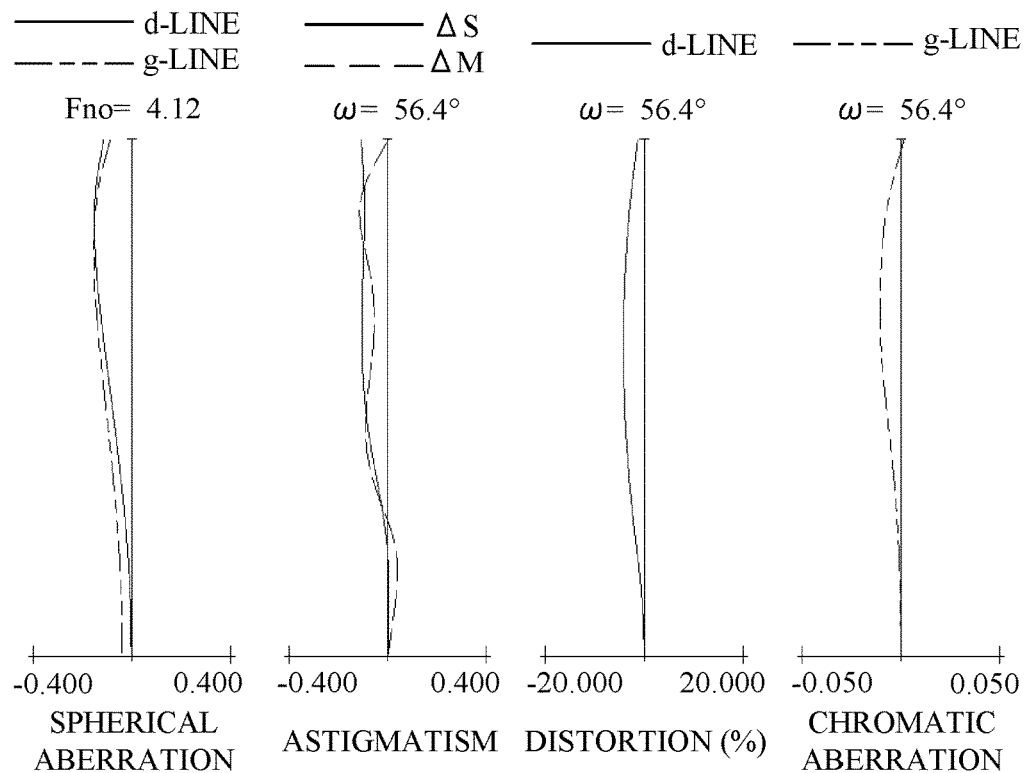
Figure 8C:
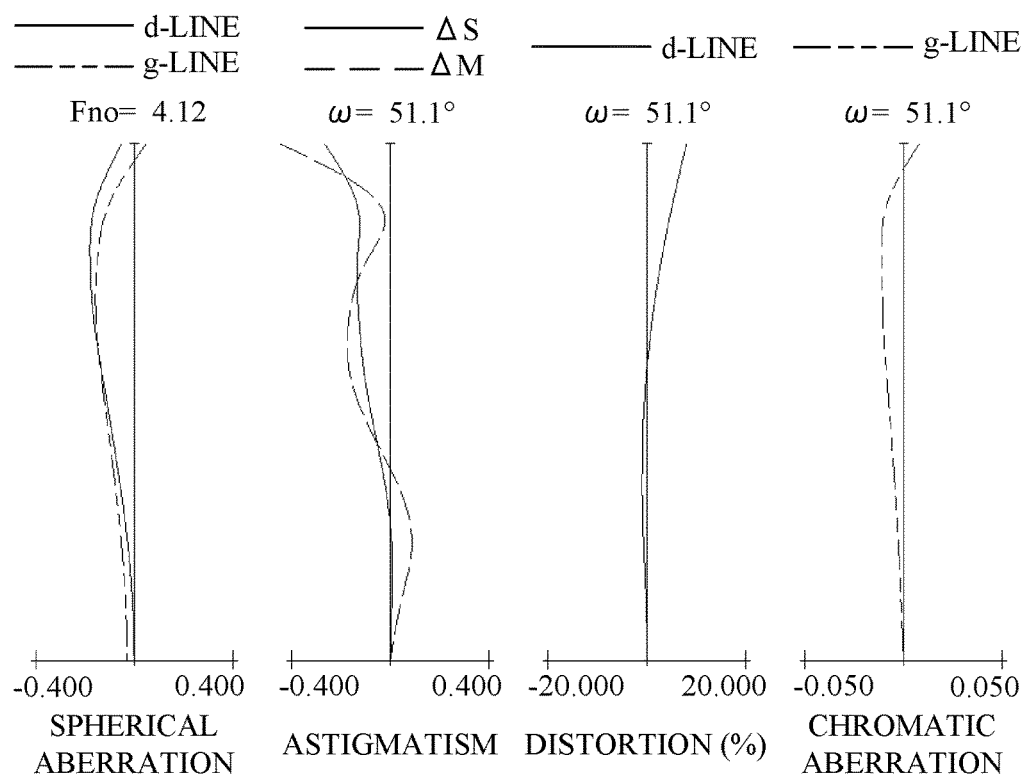

FIG. 7 is a sectional view of a zoom lens 1d at a wide-angle end according to Example 4. FIGS. 8A, 8B, and 8C are longitudinal aberration diagrams of the zoom lens 1d at the wide-angle end, a middle zoom position, and a telephoto end, respectively. The zoom lens 1d has a zoom ratio of about 1.7 times and an F-number of about 4.12. The zoom lens 1d has an overall angle of view of 124 degrees at the wide-angle end and 102 degrees at the telephoto end.

Figure 9:
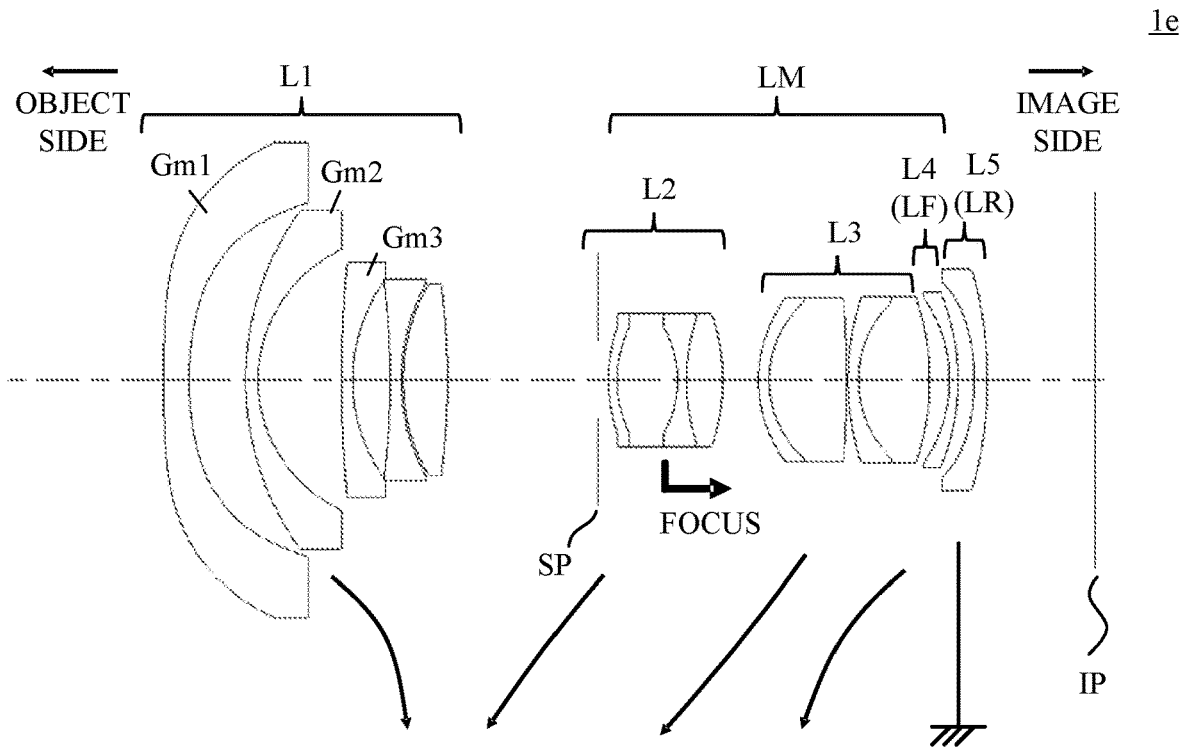
FIG. 9 is a sectional view of a zoom lens at a wide-angle end according to Example 5.
Figure 10A:
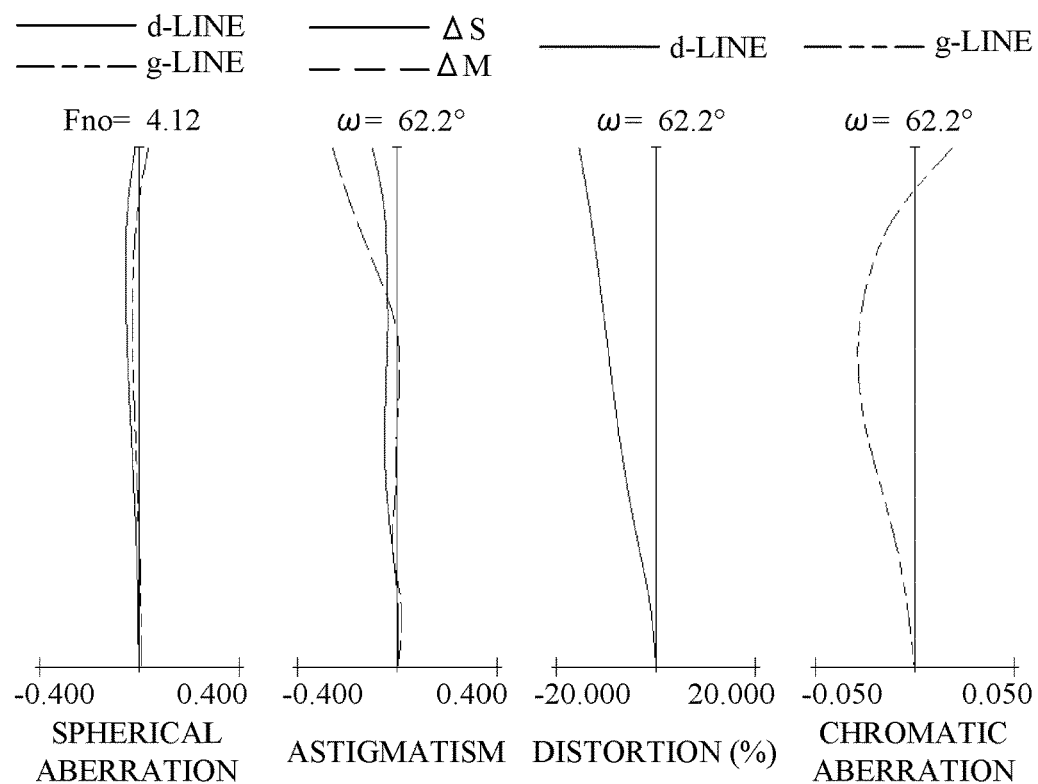
FIGS. 10A to 10C are aberration diagrams of the zoom lens at (A) the wide-angle end, (B) a middle zoom position, and (C) a telephoto end according to Example 5.
Figure 10B:
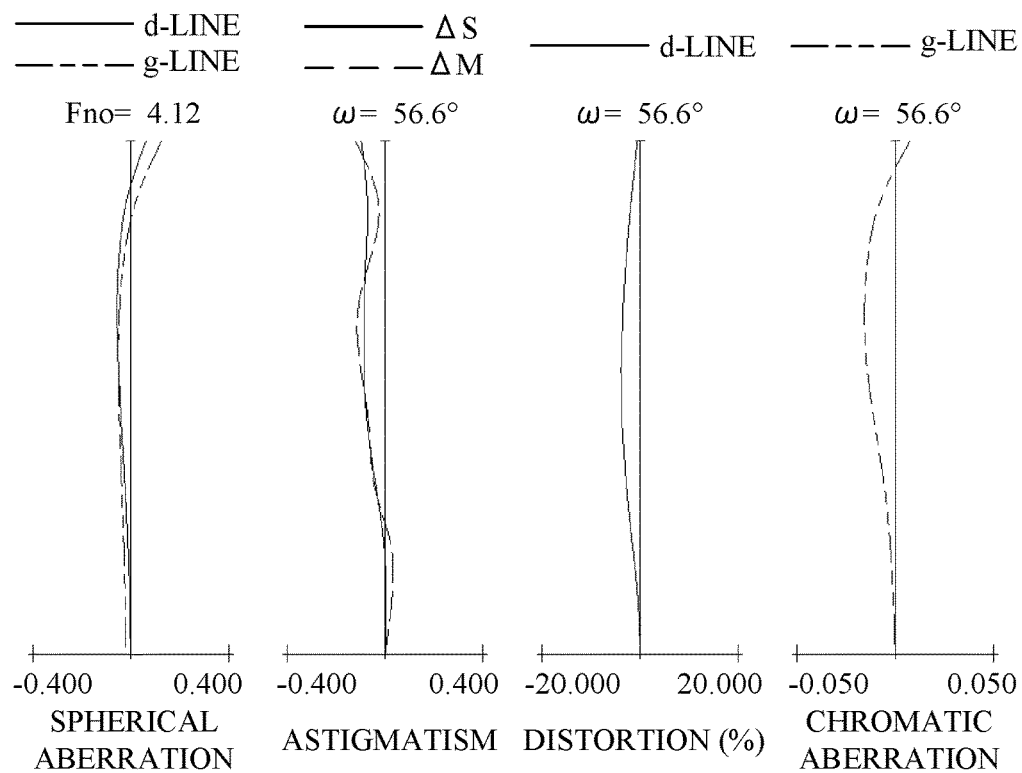
Figure 10C:
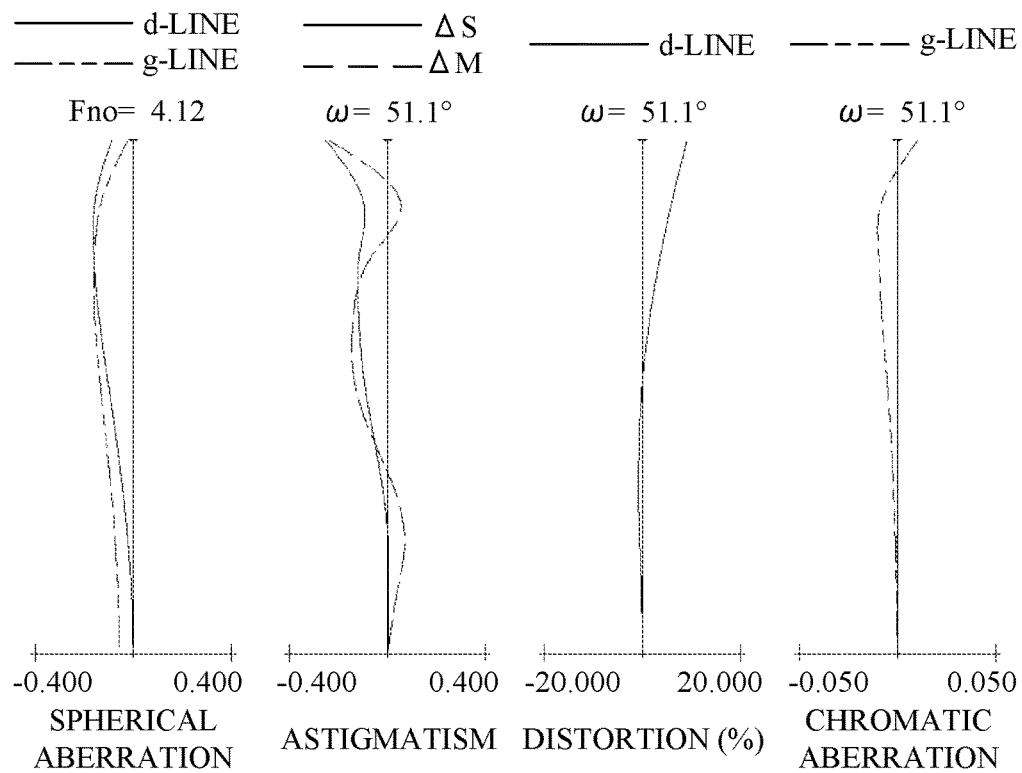

FIG. 9 is a sectional view of a zoom lens 1e at a wide-angle end according to Example 5. FIGS. 10A, 10B, and 10C are longitudinal aberration diagrams of the zoom lens 1e at the wide-angle end, a middle zoom position, and a telephoto end, respectively. The zoom lens 1e has a zoom ratio of about 1.7 times and an F-number of about 4.12. The zoom lens 1e has an overall angle of view of 125 degrees at the wide-angle end and 102 degrees at the telephoto end.

Each of the zoom lenses 1a to 1e according to the respective examples is a zoom lens used in an image pickup apparatus such as a digital video camera, a digital still camera, a broadcasting camera, a silver-halide film camera, and a monitoring camera. Each of the zoom lenses 1a to 1e according to the respective examples may also be used as a projection optical system for a projection apparatus (projector).

In each of the lens sectional views in FIGS. 1, 3, 5, 7, and 9, a left side is an object side (front side) and a right side is an image side (rear side). Each of the zoom lenses 1a to 1e according to the respective examples includes a plurality of lens units. In the specification of the present application, a lens unit refers to a group of lenses that move or stop as a whole during zooming. That is, in each of the zoom lenses 1a to 1e according to the respective examples, each distance between adjacent lens units changes during zooming from the wide-angle end to the telephoto end. A lens unit may consist of a single lens, and may include a plurality of lenses. Further, a lens unit may include an aperture diaphragm.

In each lens sectional view, a reference sign Li denotes an i-th (i is a natural number) lens unit counted from the object side among lens units included in each of the zoom lenses 1a to 1e. A reference sign Gmi (i is a natural number) denotes an i-th (i is a natural number) lens having a negative refractive power (negative lens) counted from the object side among lenses included in a first lens unit L1. A reference sign LR denotes a final lens unit that has a negative refractive power and is closest to an image in each of the zoom lenses 1a to 1e. A reference sign LF denotes a lens unit next to the final lens unit LR on the object side.

A reference sign SP denotes an aperture diaphragm (diaphragm unit). A reference sign IP denotes an image plane, and in a case where each of the zoom lenses 1a to 1e according to the respective examples is used as an image pickup optical system for a digital still camera or a digital video camera, an image pickup plane of a solid image sensor (photoelectric conversion element) such as a CCD sensor and a CMOS sensor is disposed on the image plane IP. In a case where each of the zoom lenses 1a to 1e according to the respective examples is used as an image pickup optical system of a silver-halide film camera, a photosensitive surface corresponding to a film surface is disposed on the image plane IP. In a case of a projector, IP is an object plane, and a light modulation element (display element) or a modulation surface (display surface) such as a liquid crystal panel is disposed on the image plane.

In each of the zoom lenses 1a to 1e according to the respective examples, each lens unit moves during zooming from a wide-angle end to a telephoto end as illustrated by arrows in each lens sectional view. The aperture diaphragm SP moves during zooming as illustrated by an arrow. Arrows relating to focus (FOCUS) indicate moving directions of lens units during focusing from an infinite distance object to a close distance object.

In each spherical aberration diagram in each of the aberration diagrams in FIGS. 2A to 2C, FIGS. 4A to 4C, FIGS. 6A to 6C. FIGS. 8A to 8C, and FIGS. 10A to 10C, Fno represents an F-number, and each spherical aberration diagram illustrates spherical aberration amounts with respect to a d-line (wavelength 587.6 nm) and a g-line (wavelength 435.8 nm). In each astigmatism diagram, ΔS represents an astigmatism amount on a sagittal image plane, and ΔM represents an astigmatism amount on a meridional image plane. Each distortion diagram illustrates a distortion amount with respect to the d-line. Each chromatic aberration diagram illustrates a chromatic aberration amount at the g-line. ω represents an image pickup half angle of view (°).

Next, a description is given of a characteristic configuration in each of the zoom lenses 1a to 1e according to the respective examples.

Each of the zoom lenses 1a to 1e according to the respective examples includes, in order from the object side to the image side, a first lens unit L1 having a negative refractive power, a middle group LM including one or more lens units, and the final lens unit LR having a negative refractive power. Each of the zoom lenses 1a to 1e according to the respective examples is a zoom lens in which each distance between adjacent lens units changes during zooming.

In each of the zoom lenses 1a to 1e according to the respective examples, the first lens unit L1 includes at least three negative lenses (negative meniscus lenses Gm1, Gm2, and Gm3). Thereby, the first lens unit L1 has such configuration that minimizes distortion occurring in the first lens unit L1 while ensuring negative refractive power. The at least three negative lenses included in the first lens unit L1 may be arranged consecutively in order from the object side to the image side.

Each of the zoom lenses 1a to 1e according to the respective examples is a so-called negative lead type zoom lens. A positive lead type zoom lens is beneficial to a high zoom ratio, but is disadvantageous for widening an angle of view to an overall angle of view exceeding 100 degrees at the wide-angle end.

In each of the zoom lenses 1a to 1e according to the respective examples, the final lens unit LR has a negative refractive power. In general, it is known that a wide-angle zoom lens has a so-called retrofocus type refractive power arrangement using a lens unit having a negative refractive power and a lens unit having a positive refractive power as a main configuration. In each of the zoom lenses 1a to 1e according to the respective examples, by making the final lens unit LR have the negative refractive power, a principal point position of an entire group subsequent to the first lens unit L1 (subsequent group) having a positive refractive power is moved to the object side, and thereby the overall lens length is reduced.

Furthermore, each of the zoom lenses 1a to 1e according to the respective examples satisfies the following inequalities (1) and (2).

$$0.60 < TD1^2/(f1 \times fr) < 10.00 \qquad (1)$$

$$-10.0 < (mr-mf)/fw < -0.1 \qquad (2)$$

TD1 represents a thickness on an optical axis (total thickness) of the first lens unit L1. The total thickness TD1 of the first lens unit L1 is a length on the optical axis from a lens surface closest to an object in the first lens unit L1 to a lens surface closest to an image in the first lens unit L1. f1 represents a focal length of the first lens unit L1. fr represents a focal length of the final lens unit LR. mr represents a moving amount of the final lens unit LR during zooming from a wide-angle end to a telephoto end. mf represents a moving amount of a lens unit LF next to the final lens unit LR on the object side during zooming from a wide-angle end to a telephoto end. fw represents a focal length of each of the zoom lenses 1a to 1e at the wide-angle end.

A moving amount of a lens unit corresponds to a difference between a position on the optical axis at the wide-angle end and a position on the optical axis at the telephoto end. A sign of the moving amount is assumed to be positive when the lens unit is located on the object side at the telephoto end with respect to a position of the lens unit at the wide-angle end and to be negative when the lens unit is located on the image side at the telephoto end with respect to a position of the lens unit at the wide-angle end.

The inequality (1) specifies the total thickness TD1 and the focal length f1 of the first lens unit and the focal length fr of the final lens unit LR and is for reducing the size and weight of each of the zoom lenses 1a to 1e and correct field curvature and distortion well at the wide-angle end.

If the total thickness TD1 of the first lens unit L1 is so large that the value is larger than the upper limit value of the inequality (1), many negative meniscus lenses can be disposed for distortion correction, and it is beneficial to high optical performance, but overall lens length may be increased. Further, since the first lens unit L1 is thick, a distance from the first lens unit L1 to the entrance pupil position is long, which causes increase in a front lens diameter. Alternatively, if an absolute value of the focal length f1 of the first lens unit L1 is so small that the value is larger than the upper limit value of the inequality (1), the refractive power of the first lens unit L1 is so strong that it is difficult to correct distortion and lateral chromatic aberration occurring in the first lens unit L1 at the wide-angle end. Moreover, a Petzval sum of the entire lens is so strong in the negative direction that it is difficult to correct field curvature in the entire zoom range. Alternatively, if the absolute value of the focal length fr of the final lens unit LR is so small that the value is larger than the upper limit value of the inequality (1), a refractive power of a lens unit having a positive refractive power disposed on the object side of the final lens unit LR is to be excessively increased in order that spherical aberration and field curvature is corrected. Further, if the negative refractive power of the final lens unit LR is increased, an image plane entering angle of a ray at a peripheral image height becomes too large to prevent shading.

If the total thickness TD1 of the first lens unit L1 is so small that the value is smaller than the lower limit value of the inequality (1), it is beneficial to reduction in the size and weight, but it becomes difficult to correct distortion and field curvature occurring in the first lens unit L1 while a focal length of a wide angle of view is maintained. Alternatively, if the absolute value of the focal length f1 of the first lens unit L1 is so large that the value is smaller than the lower limit value of the inequality (1), it is beneficial to correction of aberration such as distortion and field curvature, but it is difficult to widen the angle of view. Alternatively, if the absolute value of the focal length fr of the final lens unit LR is so large that the value is smaller than the lower limit value of the inequality (1), it is difficult to move the principal point position of lens units subsequent to the first lens unit L1 as a whole to the object side, which makes it difficult to reduce the overall lens length.

The inequality (2) specifies the moving amount mr of the final lens unit LR during zooming, the moving amount mf of the lens unit LF during zooming, and the focal length fw at the wide-angle end, and is for reducing the overall lens length at the telephoto end while correcting field curvature well over the entire zoom range. The inequality (2) takes a negative value. In other words, the relationship is such that the final lens unit LR relatively moves away from the lens unit LF during zooming.

If the difference between the moving amount mr of the final lens unit LR and the moving amount mf of the lens unit LF is so large during zooming that the value is smaller than the lower limit value of the inequality (2), the position of the final lens unit LR is too close to an image at the telephoto end, which makes it difficult to correct distortion at the telephoto end. Alternatively, if the focal length fw at the wide-angle end is so small that the value is smaller than the lower limit value of the inequality (2), the angle of view widens too much, which makes the front lens diameter too large.

If the difference between the moving amount mr of the final lens unit LR and the moving amount mf of the lens unit LF is so small during zooming that the value is larger than the upper limit value of the inequality (2), the final lens unit LR is extended too much to the object side at the telephoto end, which makes it difficult to ensure the zoom ratio. As a result, it becomes difficult to achieve a desired focal length at the telephoto end. Alternatively, if the focal length fw at the wide-angle end is so large that the value is larger than the upper limit value of the inequality (2), it is difficult to acquire a desired angle of view at the wide-angle end.

A description is given of conditions that may be satisfied in each of the zoom lenses 1a to 1e according to the respective examples. Each of the zoom lenses 1a to 1e according to the respective examples may satisfy one or more of the following inequalities (3) to (10).

$$0.5 < TD1/skw < 5.0 \qquad (3)$$

$$-12.0 < fr/fw < -2.0 \qquad (4)$$

$$2.0 < POw/fw < 10.0 \qquad (5)$$

$$-8.0 < \text{fave}/fw < -2.0 \qquad (6)$$

$$1.0 < (R2+R1)/(R2-R1) < 10.0 \qquad (7)$$

$$-3.0 < ft/fl < -0.5 \qquad (8)$$

$$0.05 < TDr/fw < 0.50 \qquad (9)$$

$$2.0 < TTDt/ft < 10.0 \qquad (10)$$

skw represents a back focus of each of the zoom lenses 1a to 1e at the wide-angle end. POw represents a distance from the image plane IP to an exit pupil position of each of the zoom lenses 1a to 1e at the wide-angle end. A sign of the distance POw from the image plane IP to the exit pupil position is assumed to be negative when the exit pupil is located on the image side of the image plane IP, and to be positive when the exit pupil is located on the object side of the image plane IP. fave represents an average focal length of at the at least three negative lenses (Gm1, Gm2, and Gm3) included in the first lens unit L1. R1 represents a curvature radius of an object-side lens surface (surface on the object side) of a lens disposed at a position closest to an image in the final lens unit LR. R2 represents a curvature radius of an image-side lens surface (lens surface on the image side) of a lens closest to an image in the final lens unit LR. ft represents a focal length of each of the zoom lenses 1a to 1e at the telephoto end. TDr represents a thickness on the optical axis (total thickness) of the final lens unit LR. TTDt represents an overall lens length of each of the zoom lenses 1a to 1e at the telephoto end.

The inequality (3) specifies a relationship between the total thickness TD1 of the first lens unit L1 and the back focus skw at the wide-angle end and is for correcting distortion well at the wide-angle end while reducing the overall lens length.

If the total thickness TD1 of the first lens unit L1 is so large that the value is larger than the upper limit value of the inequality (3), a large number of negative lenses can be disposed for distortion correction and it is beneficial to high optical performance, but the overall lens length may be increased. Further, since the first lens unit L1 is thick, the distance from the first lens unit L1 to the entrance pupil position is long, which may cause an increase in the front lens diameter. Alternatively, if the back focus skw is small, a mechanical layout of a connection between each of the zoom lenses (image pickup optical system) 1a to 1e and a camera body becomes difficult.

On the other hand, if the total thickness TD1 of the first lens unit L1 is so small that the value is smaller than the lower limit value of the inequality (3), although it is beneficial to the reduction of the overall lens length, it is difficult to correct distortion while a wide angle of view is maintained. In addition, if a wide angle of view to be ensured while the total thickness TD1 of the first lens unit L1 is kept small, the refractive power of the first lens unit L1 is to be increased, which causes deterioration in field curvature and lateral chromatic aberration. Alternatively, if the back focus skw is large, the back focus space is unnecessarily ensured, which may increase the overall lens length.

The inequality (4) specifies the focal length fr of the final lens unit LR and the focal length fw of each of the zoom lenses 1a to 1e at the wide-angle end and is for reducing the overall lens length.

If the absolute value of the focal length fr of the final lens unit LR is so large that the value is smaller than the lower limit value of the inequality (4), since the principal point position of the entire subsequent group located on the image side of the first lens unit L1 moves to the image side, the retrofocus arrangement is weakened at the wide-angle end. As a result, the overall lens length at the wide-angle end increases, making it difficult to realize the purpose of the reduction in the overall lens length. Alternatively, if the focal length fw of each of the zoom lenses 1a to 1e at the wide-angle end is so small that the value is smaller than the lower limit value of the inequality (4), the angle of view widens too much, which causes not only deterioration in lateral chromatic aberration and field curvature but also an increase in the front lens diameter.

If the absolute value of the focal length fr of the final lens unit LR is so small that the value is larger than the upper limit value of the inequality (4), it is beneficial to the reduction of the overall lens length at the wide-angle end. However, the entering angle of peripheral rays reaching the image plane IP becomes so large that the so-called shading occurring at the image plane IP deteriorates. In addition, field curvature at the wide-angle end deteriorates. Alternatively, if the focal length fw at the wide-angle end is so large that the value is larger than the upper limit value of the inequality (4), a desired angle of view cannot be acquired at the wide-angle end.

The inequality (5) specifies a relationship between the distance POw to the exit pupil at the wide-angle end and the focal length fw of each of the zoom lenses 1a to 1e at the wide-angle end and is for ensuring high telecentricity. If the distance POw to the exit pupil is so large that the value is larger than the upper limit value of the inequality (5), the refractive power of the final lens unit LR is likely to increase, making it difficult to reduce field curvature well. On the other hand, if the distance POw to the exit pupil is so small that the value is smaller than the lower limit value of the inequality (5), the image plane entering angle of the ray at the peripheral image height is too large, which may cause shading. Otherwise, the focal length fw at the wide-angle end increases, making it difficult to realize a desired width of the angle of view.

The inequality (6) specifies the average focal length fava of the at least three negative lenses (Gm1, Gm2, and Gm3) included in the first lens unit L1 and the focal length fw at the wide-angle end and is for realizing both good aberration correction a the wide-angle end and reduction in the front lens diameter.

If the absolute value of the average focal length fave is so small that the value is larger than the upper limit value of the inequality (6), the negative refractive power on the object side in the first lens unit L1 is so strong that it is difficult to sufficiently correct lateral chromatic aberration and distortion at the wide-angle end. Alternatively, if the focal length fw at the wide-angle end is so large that the value is larger than the upper limit value of the inequality (6), it is difficult to acquire a desired angle of view at the wide-angle end.

If the absolute value of the average focal length fave is so large that the value is smaller than the lower limit value of the inequality (6), the refractive power of the at least three negative lenses included in the first lens unit L1 is weak, and it is beneficial to aberration correction. However, the entrance pupil of the first lens unit L1 moves to the image side, and the front lens diameter increases. Alternatively, if the focal length fw at the wide-angle end is so small that the value is smaller than the lower limit value of the inequality (6), the angle of view widens, but it is difficult to correct distortion and lateral chromatic aberration occurring in the first lens unit L1.

The inequality (7) specifies a shape factor of the lens closest to an image in the final lens unit LR and is for properly correcting aberration in the final lens unit LR. The range of the inequality (7) indicates that the lens closest to an image has a meniscus shape convex toward the image side. If the meniscus shape of the lens closest to an image is so strong that the value is larger than the upper limit value of the inequality (7), it is difficult to correct field curvature at the wide-angle end. If the meniscus shape of the lens closest to an image is so weak that the value is smaller than the lower limit value of the inequality (7), it is difficult to correct distortion at the telephoto end. Further, since the lens closest to an image has a shape concave on the image side, it is difficult to eliminate ghosts and flares caused by image plane reflections.

The inequality (8) specifies the focal length ft at the telephoto end and the focal length f1 of the first lens unit L1 and is for acquiring a desired zooming magnification.

If the focal length ft at the telephoto end is so large that the value is smaller than the lower limit value of the inequality (8), it is difficult to correct aberration, especially lateral chromatic aberration, at the telephoto end. Alternatively, if the absolute value of the focal length f1 of the first lens unit L1 is so small that the value is smaller than the lower limit value of the inequality (8), the refractive power of the first lens unit L1 is so strong that the back focus at the wide-angle end increases, which may increase the overall lens length. Further, it is difficult for the subsequent group to cancel lateral chromatic aberration occurring at the wide-angle end.

If the focal length ft at the telephoto end is so small that the value is larger than the upper limit value of the inequality (8), the desired zooming magnification cannot be acquired. Alternatively, if the absolute value of the focal length f1 of the first lens unit L1 is so large that the value is larger than the upper limit value of the inequality (8), the positive refractive power of the entire lens is so strong that it is difficult to control the Petzval sum, which makes it difficult to acquire desired optical performance.

The inequality (9) specifies the total thickness TDr of the final lens unit LR and the focal length fw at the wide-angle end and is for maintaining a small overall lens length.

If the total thickness TDr of the final lens unit LR is so large that the value is larger than the upper limit value of the inequality (9), the final lens unit LR having the negative refractive power is large. In order that a positive refractive power necessary for the entire subsequent group is ensured, the thickness of the subsequent group becomes large, which may increase the size and the weight. Alternatively, if the focal length fw at the wide-angle end is so small that the value is larger than the upper limit value of the inequality (9), the angle of view widens, but it is difficult to reduce distortion and lateral chromatic aberration at the wide-angle end.

If the total thickness TDr of the final lens unit LR is so small that the value is smaller than the lower limit value of the inequality (9), it is difficult to manufacture thin lenses due to manufacturing requirements and to correct field curvature well at the wide-angle end. Alternatively, if the focal length fw at the wide-angle end is so large that the value is smaller than the lower limit value of the inequality (9), it is difficult to acquire a desired angle of view at the wide-angle end.

The inequality (10) specifies the overall lens length TTDt of each of the zoom lenses 1a to 1e at the telephoto end and the focal length ft at the telephoto end and is for reducing the overall lens length at the telephoto end.

If the overall lens length TTDt at the telephoto end is so large that the value is larger than the upper limit value of the inequality (10), the size and the weight may be too large. Alternatively, if the focal length ft at the telephoto end is so small that the value is larger than the upper limit value of the inequality (10), the desired zooming magnification cannot be acquired.

If the overall lens length TTDr at the telephoto end is so small that the value is smaller than the lower limit value of the inequality (10), a large moving amount of the first lens unit L1 from the wide-angle end is to be ensured. As a result, the front lens diameter is likely to increase. Alternatively, if the focal length ft at the telephoto end is so large that the value is smaller than the lower limit value of the inequality (10), the zooming magnification increases, but it is difficult to reduce variations in lateral chromatic aberration and field curvature during zooming from the wide-angle end to the telephoto end.

The numerical ranges of the inequalities (1) to (10) may be set to numerical ranges of the following inequalities (1a) to (10a).

$$0.61 < TD1^2/(ft \times fr) < 8.00 \quad (1a)$$

$$-5.00 < (mr-mf)/fw < -0.11 \quad (2a)$$

$$1.0 < TD1/skw < 4.0 \quad (3a)$$

$$-11.0 < fr/fw < -3.0 \quad (4a)$$

$$2.5 < POw/fw < 6.0 \quad (5a)$$

$$-6.0 < fave/fw < -3.0 \quad (6a)$$

$$1.1 < (R2+R1)/(R2-R1) < 5.0 \quad (7a)$$

$$-2.00 < ft/f1 < -0.75 \quad (8a)$$

$$0.075 < TDr/fw < 0.300 \quad (9a)$$

$$3.0 < TTDt/ft < 7.0 \quad (10a)$$

The numerical ranges of the inequalities (1) to (10) may be set to numerical ranges of the following inequalities (1b) to (10b).

$$0.62 < TD1^2/(ft \times fr) < 3.00 \quad (1b)$$

$$-1.00 < (mr-mf)/fw < -0.13 \quad (2b)$$

$$1.5 < TD1/skw < 3.0 \quad (3b)$$

$$-10.0 < fr/fw < -5.0 \quad (4b)$$

$$3.0 < POw/fw < 5.0 \quad (5b)$$

$$-5.0 < fave/fw < -4.0 \quad (6b)$$

$$1.3 < (R2+R1)/(R2-R1) < 4.0 \quad (7b)$$

$$-1.5 < ft/f1 < -1.0 \quad (8b)$$

$$0.09 < TDr/fw < 0.20 \quad (9b)$$

$$5.0 < TTDt/ft < 6.0 \quad (10b)$$

Next, a description is given of configurations that may be satisfied in each of the zoom lenses 1a to 1e according to the respective examples.

In each of the zoom lenses 1a to 1e according to the respective examples, the final lens unit LR may consist of a negative single lens. By using a single lens as the final lens unit LR having the negative refractive power included in the subsequent group on the image side of the first lens unit L1, it is beneficial to reduction in the size of the entire subsequent group.

The final lens unit LR may have an aspherical surface. By setting an aspherical surface in the final lens unit LR in which a light beam at the peripheral image height and a light beam at a central image height are separated, field curvature at the wide-angle end can be corrected well.

Next, a description is given of a lens configuration of each of the zoom lenses 1a to 1e according to the respective examples.

Each of the zoom lens 1a according to Example 1 and the zoom lens 1b according to Example 2 is a four-unit zoom lens including a first lens unit L1 to a fourth lens unit L4 having negative, positive, positive, and negative refractive powers in order from the object side to the image side. In each of the zoom lenses 1a and 1b, an aperture diaphragm SP is disposed at a position closest to an object in the second lens unit L2. The final lens unit LR is the fourth lens unit L4, and the lens unit LF next to the final lens unit LR on the object side is the third lens unit L3.

The first lens unit L1 moves toward the image side during zooming from the wide-angle end to the telephoto end. The aperture diaphragm SP, the second lens unit L2, and the third lens unit L3 move to the object side during zooming from the wide-angle end to the telephoto end. During zooming, the second lens unit L2 and the third lens unit L3 (LF) move so that the distance therebetween widens. During zooming, the fourth lens unit L4 (LR) moves toward the object side so that a distance from the third lens unit L3 (LF) widens. The second lens unit L2 moves during focusing.

The zoom lens 1c according to Example 3 is a three-unit zoom lens including a first lens unit L1, a second lens unit L2 (LF), and a third lens unit L3 (LR) having negative, positive, and negative refractive powers in order from the object side to the image side. An aperture diaphragm SP is disposed at a position closest to an object in the second lens unit L2.

During zooming from the wide-angle end to the telephoto end, the first lens unit L1 moves toward the image side, and the second lens unit L2 (LF) moves toward the object side so that the distance from the first lens unit L1 narrows. During zooming, the third lens unit L3 (LR) moves toward the object side so that the distance from the second lens unit L2 (LF) widens. During focusing, a single positive lens disposed at a position closest to an image in the first lens unit L1 moves.

The zoom lens 1d according to Example 4 is a four-unit zoom lens including a first lens unit L1 to a fourth lens unit L4 having negative, positive, positive, and negative refractive powers in order from the object side to the image side. An aperture diaphragm SP is disposed at a position closest to an object in the second lens unit L2.

During zooming from the wide-angle end to the telephoto end, the first lens unit L1 moves toward the image side and the second lens unit L2 moves toward the object side. The third lens unit L3 (LF) moves so that a distance from the second lens unit narrows. The fourth lens unit L4 (LR) does not move during zooming. The second lens unit L2 moves during focusing.

The zoom lens 1e according to Example 5 is a five-unit zoom lens including a first lens unit to L1 a fifth lens unit L5 having negative, positive, positive, negative, and negative refractive powers, in order from the object side to the image side. An aperture diaphragm SP is disposed at a position closest to an object in the second lens unit L2.

During zooming from the wide-angle end to the telephoto end, the first lens unit L1 moves toward the image side and the second lens unit L2 moves toward the object side. The third lens unit L3 moves toward the object side so that the distance from the second lens unit L2 narrows. The fourth lens unit L4 (LF) moves toward the object side so that the distance from the third lens unit L3 widens. The fifth lens unit L5 (LR) does not move during zooming. The second lens unit L2 moves during focusing.

Numerical Examples 1 to 5 respectively corresponding to Examples 1 to 5 are given below.

In surface data in each numerical example, r represents a curvature radius of each optical surface, and d (mm) represents an on-axis distance (distance on an optical axis) between an m-th surface and an (m+1)-th surface. m is a number of the surface counted from a light entering side. nd represents a refractive index with respect to the d-line of each optical member, and vd represents an Abbe number of each optical member. An Abbe number vd of a certain material is expressed by the following equation where Nd, NF, and NC represent refractive indexes with respect to the d-line (587.6 nm), an F-line (486.1 nm), and a C-line (656.3 nm) of Fraunhofer lines.

$$vd=(Nd-1)/(NF-NC)$$

In each numerical example, values of d, focal length (mm), F-number, and half angle of view (°) are all values in a state where each of the zoom lenses 1a to 1e according to the respective examples focuses on an infinite distance object. "BF" (Back Focus) is an air conversion length of a distance on the optical axis from a lens last surface (lens surface closest to the image side) to a paraxial image plane. "Overall lens length" is a length acquired by adding the back focus to a distance on the optical axis from a foremost lens surface in the zoom lens (lens surface closest to the object side) to the last surface. "Lens Unit" is not limited to a configuration including a plurality of lenses, but may have a configuration consisting of a single lens.

In a case where an optical surface is an aspherical surface, a sign * is attached to a right side of a surface number. An aspherical shape is expressed by the following equation where x represents a displacement amount from a surface vertex in the optical axis direction, h represents a height from the optical axis in the direction orthogonal to the optical axis, R represents a paraxial curvature radius, k represents a conic constant, and A4, A6, A8, A10, A12, and A14 represent aspherical surface coefficients of respective orders.

$$x=(h^2/R)/[1+\{1-(1+k)(h/R)^2\}^{1/2}]+A4\times h^4+A6\times h^6+A8\times h^8+A10\times h^{10}+A12\times h^{12}+A14\times h^{14}$$

"e±XX" in each aspherical surface coefficient represents "$\times 10^{\pm XX}$".

NUMERICAL EXAMPLE 1

| Unit mm | | | | |
|---|---|---|---|---|
| SURFACE DATA | | | | |
| Surface Number | r | d | nd | vd |
| 1* | 72.063 | 2.90 | 1.80400 | 46.6 |
| 2* | 26.089 | 5.22 | | |
| 3 | 30.802 | 1.40 | 2.00100 | 29.1 |
| 4 | 15.833 | 7.94 | | |
| 5 | 74.154 | 1.30 | 1.72916 | 54.7 |
| 6 | 17.697 | 5.96 | | |
| 7 | −50.904 | 1.30 | 1.49700 | 81.5 |
| 8 | 19.613 | 0.20 | | |
| 9 | 19.629 | 6.63 | 1.64769 | 33.8 |

-continued

Unit mm

| | | | | |
|---|---|---|---|---|
| 10 | −52.032 | (Variable) | | |
| 11 (Diaphragm) | ∞ | 1.27 | | |
| 12 | 15.207 | 1.00 | 1.98612 | 16.5 |
| 13 | 11.273 | 6.70 | 1.51742 | 52.4 |
| 14 | −17.526 | 1.00 | 1.90043 | 37.4 |
| 15 | 16.259 | 4.01 | 1.80810 | 22.8 |
| 16 | −35.635 | (Variable) | | |
| 17 | 14.359 | 1.20 | 2.05090 | 26.9 |
| 18 | 10.914 | 7.82 | 1.49700 | 81.5 |
| 19 | −56.745 | 0.15 | | |
| 20 | 20.172 | 1.20 | 1.95375 | 32.3 |
| 21 | 10.293 | 8.27 | 1.43875 | 94.7 |
| 22 | 216.278 | (Variable) | | |
| 23* | −44.874 | 1.50 | 2.00100 | 29.1 |
| 24 | −241.108 | (Variable) | | |
| Image Plane | ∞ | | | |

ASPHERICAL SURFACE DATA

1st Surface

K = 0.00000e+000 A 4 = 1.33902e−005 A 6 = 2.91057e−008
A 8 = −1.28735e−010 A10 = 2.51334e−013 A12 = −2.33449e−016
A14 = 9.78493e−020

2nd Surface

K = −2.18793e+000 A 4 = 1.80881e−005 A 6 = 7.96064e−008
A 8 = 1.06798e−010 A10 = −1.71074e−012 A12 = 5.08897e−015
A14 = −4.61662e−018

23rd Surface

K = 0.00000e+000 A 4 = −5.76115e−005 A 6 = 1.78402e−008
A 8 = −1.18082e−009 A10 = −3.50838e−012 A12 = 8.05514e−014

VARIOUS DATA
Zoom Ratio 1.88

| | Wide Angle | Middle | Telephoto |
|---|---|---|---|
| Focal Length: | 9.27 | 13.03 | 17.46 |
| F-NUMBER: | 4.12 | 4.12 | 4.12 |
| Half Angle of View (°): | 63.98 | 56.92 | 51.10 |
| Image Height: | 19.00 | 20.00 | 21.64 |
| Overall Lens Length: | 108.47 | 102.77 | 100.80 |
| BF: | 15.71 | 19.67 | 23.00 |
| d10 | 20.01 | 8.87 | 1.45 |
| d16 | 2.69 | 2.84 | 2.59 |
| d22 | 3.08 | 4.43 | 6.79 |
| d24 | 15.71 | 19.67 | 23.00 |

ZOOM LENS UNIT DATA

| Unit | Starting Surface | Focal Length |
|---|---|---|
| 1 | 1 | −14.55 |
| 2 | 11 | 49.14 |
| 3 | 17 | 32.72 |
| 4 | 23 | −55.29 |

NUMERICAL EXAMPLE 2

Unit mm

SURFACE DATA

| Surface Number | r | d | nd | vd |
|---|---|---|---|---|
| 1* | 47.256 | 2.20 | 1.72916 | 54.7 |
| 2* | 17.118 | 2.79 | | |
| 3 | 24.198 | 1.40 | 2.00100 | 29.1 |
| 4 | 15.482 | 9.78 | | |
| 5 | 93.291 | 1.30 | 1.72916 | 54.7 |
| 6 | 17.451 | 5.47 | | |

-continued

Unit mm

| | | | | |
|---|---|---|---|---|
| 7 | −89.287 | 1.30 | 1.49700 | 81.5 |
| 8 | 25.838 | 0.20 | | |
| 9 | 22.822 | 5.58 | 1.73800 | 32.3 |
| 10 | −84.298 | (Variable) | | |
| 11 (Diaphragm) | ∞ | 1.24 | | |
| 12 | 16.172 | 1.00 | 1.98612 | 16.5 |
| 13 | 11.597 | 5.85 | 1.51742 | 52.4 |
| 14 | −16.472 | 1.00 | 1.90043 | 37.4 |
| 15 | 16.494 | 3.89 | 1.80810 | 22.8 |
| 16 | −32.381 | (Variable) | | |
| 17 | 15.972 | 1.20 | 2.05090 | 26.9 |
| 18 | 12.131 | 8.38 | 1.49700 | 81.5 |
| 19 | −36.138 | 0.15 | | |
| 20 | 20.739 | 1.20 | 1.95375 | 32.3 |
| 21 | 10.634 | 11.55 | 1.43875 | 94.7 |
| 22 | 51.020 | (Variable) | | |
| 23* | −42.509 | 1.50 | 2.00069 | 25.5 |
| 24 | −81.533 | (Variable) | | |
| Image Plane | ∞ | | | |

ASPHERICAL SURFACE DATA

1st Surface

K = 0.00000e+000 A 4 = 3.68563e−006 A 6 = 1.13383e−008
A 8 = −5.34353e−011 A10 = 9.92130e−014 A12 = −9.28575e−017
A14 = 3.46574e−020

2nd Surface

K = −2.88595e+000 A 4 = 4.69727e−005 A 6 = −2.52131e−008
A 8 = 5.96275e−011 A10 = −4.24223e−013 A12 = 4.44692e−016
A14 = 2.58187e−020

23rd Surface

K = 0.00000e+000 A 4 = −5.67278e−005 A 6 = 1.43835e−007
A 8 = −3.07928e−009 A10 = 9.76724e−012 A12 = 1.90744e−014

VARIOUS DATA
Zoom Ratio 1.88

| | Wide Angle | Middle | Telephoto |
|---|---|---|---|
| Focal Length: | 9.28 | 13.27 | 17.46 |
| F-NUMBER: | 4.12 | 4.12 | 4.12 |
| Half Angle of View (°): | 63.97 | 56.44 | 51.10 |
| Image Height: | 19.00 | 20.00 | 21.64 |
| Overall Lens Length: | 106.59 | 99.64 | 98.05 |
| BF: | 13.00 | 17.96 | 23.00 |
| d10 | 20.04 | 8.07 | 1.47 |
| d16 | 3.45 | 2.91 | 2.24 |
| d22 | 3.11 | 3.72 | 4.37 |
| d24 | 13.00 | 17.96 | 23.00 |

ZOOM LENS UNIT DATA

| Unit | Starting Surface | Focal Length |
|---|---|---|
| 1 | 1 | −15.92 |
| 2 | 11 | 53.93 |
| 3 | 17 | 34.41 |
| 4 | 23 | −90.49 |

NUMERICAL EXAMPLE 3

Unit mm

SURFACE DATA

| Surface Number | r | d | nd | vd |
|---|---|---|---|---|
| 1* | 41.524 | 2.00 | 1.79490 | 47.8 |
| 2* | 18.041 | 5.22 | | |
| 3 | 27.945 | 1.20 | 2.00100 | 29.1 |

-continued

Unit mm

| | | | | |
|---|---|---|---|---|
| 4 | 14.785 | 5.44 | | |
| 5 | 40.461 | 1.00 | 1.72916 | 54.7 |
| 6 | 16.136 | 6.21 | | |
| 7 | −32.454 | 0.80 | 1.49700 | 81.5 |
| 8 | 21.581 | 0.20 | | |
| 9 | 21.295 | 5.64 | 1.74171 | 35.7 |
| 10 | −54.446 | (Variable) | | |
| 11 (Diaphragm) | ∞ | 1.29 | | |
| 12 | 17.175 | 1.00 | 1.98612 | 16.5 |
| 13 | 12.309 | 5.39 | 1.51742 | 52.4 |
| 14 | −16.210 | 1.00 | 1.90043 | 37.4 |
| 15 | 13.455 | 5.90 | 1.80810 | 22.8 |
| 16 | −33.138 | 0.15 | | |
| 17 | 14.137 | 1.20 | 2.05090 | 26.9 |
| 18 | 10.995 | 8.00 | 1.49700 | 81.5 |
| 19 | −39.495 | 0.15 | | |
| 20 | 22.991 | 1.20 | 1.95375 | 32.3 |
| 21 | 9.977 | 11.97 | 1.43875 | 94.7 |
| 22 | −106.448 | (Variable) | | |
| 23* | 55.339 | 1.20 | 2.00100 | 29.1 |
| 24 | 29.465 | (Variable) | | |
| Image Plane | ∞ | | | |

ASPHERICAL SURFACE DATA

1st Surface

K = 0.00000e+000 A 4 = 1.92621e−005 A 6 = −1.86286e−008
A 8 = −8.89542e−011 A10 = 4.12893e−013 A12 = −5.43799e−016
A14 = 2.32884e−019

2nd Surface

K = −3.02767e+000 A 4 = 6.83449e−005 A 6 = −8.55642e−008
A 8 = 7.17943e−010 A10 = −6.79416e−012 A12 = 2.84840e−014
A14 = −3.86250e−017

23rd Surface

K = 0.00000e+000 A 4 = −3.68849e−005 A 6 = 9.41564e−009
A 8 = 1.14340e−009 A10 = −1.58117e−011 A12 = 8.24714e−014

VARIOUS DATA
Zoom Ratio 1.88

| | Wide Angle | Middle | Telephoto |
|---|---|---|---|
| Focal Length: | 9.29 | 13.30 | 17.45 |
| F-NUMBER: | 4.12 | 4.12 | 4.12 |
| Half Angle of View (°): | 63.94 | 56.38 | 51.11 |
| Image Height: | 19.00 | 20.00 | 21.64 |
| Overall Lens Length: | 105.60 | 99.31 | 98.26 |
| BF: | 16.71 | 19.85 | 23.00 |
| d10 | 20.20 | 8.40 | 1.84 |
| d22 | 2.53 | 4.90 | 7.27 |
| d24 | 16.71 | 19.85 | 23.00 |

ZOOM LENS UNIT DATA

| Unit | Starting Surface | Focal Length |
|---|---|---|
| 1 | 1 | −14.46 |
| 2 | 11 | 22.20 |
| 3 | 23 | −64.45 |

NUMERICAL EXAMPLE 4

Unit mm

SURFACE DATA

| Surface Number | r | d | nd | νd |
|---|---|---|---|---|
| 1* | 220.275 | 2.90 | 1.72916 | 54.7 |
| 2* | 32.410 | 6.15 | | |

-continued

Unit mm

| | | | | |
|---|---|---|---|---|
| 3 | 31.175 | 1.40 | 1.88300 | 40.8 |
| 4 | 16.115 | 9.51 | | |
| 5 | −290.660 | 1.30 | 1.72916 | 54.7 |
| 6 | 22.553 | 3.91 | | |
| 7 | −169.571 | 1.30 | 1.49700 | 81.5 |
| 8 | 21.068 | 0.20 | | |
| 9 | 21.618 | 6.82 | 1.71491 | 36.9 |
| 10 | −85.580 | (Variable) | | |
| 11 (Diaphragm) | ∞ | 1.19 | | |
| 12 | 17.641 | 1.00 | 1.98612 | 16.5 |
| 13 | 13.039 | 5.84 | 1.54531 | 64.0 |
| 14 | −14.123 | 1.00 | 1.90043 | 37.4 |
| 15 | 21.053 | 4.10 | 1.80810 | 22.8 |
| 16 | −23.652 | (Variable) | | |
| 17 | 16.079 | 1.20 | 2.05090 | 26.9 |
| 18 | 11.931 | 11.74 | 1.49700 | 81.5 |
| 19 | −84.810 | 0.15 | | |
| 20 | 30.614 | 1.20 | 1.95375 | 32.3 |
| 21 | 11.826 | 7.43 | 1.43875 | 94.7 |
| 22 | −101.861 | (Variable) | | |
| 23* | −37.104 | 1.50 | 1.88300 | 40.8 |
| 24 | −79.002 | (Variable) | | |
| Image Plane | ∞ | | | |

ASPHERICAL SURFACE DATA

1st Surface

K = 0.00000e+000 A 4 = 1.97191e−005 A 6 = 2.99251e−008
A 8 = −1.74633e−010 A10 = 3.51937e−013 A12 = −3.26372e−016
A14 = 1.26655e−019

2nd Surface

K = −2.47970e+000 A 4 = 2.99962e−005 A 6 = −9.92794e−009
A 8 = 8.42560e−010 A10 = −4.80444e−012 A12 = 1.10882e−014
A14 = −8.16079e−018

23rd Surface

K = 0.00000e+000 A 4 = −3.86203e−005 A 6 = −2.01864e−007
A 8 = 1.20212e−009 A10 = −1.31950e−011 A12 = 4.25469e−014

VARIOUS DATA
Zoom Ratio 1.74

| | Wide Angle | Middle | Telephoto |
|---|---|---|---|
| Focal Length: | 10.01 | 13.27 | 17.46 |
| F-NUMBER: | 4.12 | 4.12 | 4.12 |
| Half Angle of View (°): | 62.23 | 56.44 | 51.10 |
| Image Height: | 19.00 | 20.00 | 21.64 |
| Overall Lens Length: | 110.09 | 104.20 | 100.83 |
| BF: | 15.91 | 15.91 | 15.91 |
| d10 | 18.93 | 8.96 | 1.51 |
| d16 | 3.46 | 3.42 | 2.08 |
| d22 | 1.95 | 6.06 | 11.49 |
| d24 | 15.91 | 15.91 | 15.91 |

ZOOM LENS UNIT DATA

| Unit | Starting Surface | Focal Length |
|---|---|---|
| 1 | 1 | −14.76 |
| 2 | 11 | 36.53 |
| 3 | 17 | 50.52 |
| 4 | 23 | −80.58 |

NUMERICAL EXAMPLE 5

SURFACE DATA

Unit mm

| Surface Number | r | d | nd | vd |
|---|---|---|---|---|
| 1* | 224.242 | 2.90 | 1.72916 | 54.7 |
| 2* | 36.428 | 6.51 | | |
| 3 | 33.747 | 1.40 | 1.88300 | 40.8 |
| 4 | 16.495 | 9.51 | | |
| 5 | 138.399 | 1.30 | 1.72916 | 54.7 |
| 6 | 19.606 | 4.29 | | |
| 7 | −89.955 | 1.30 | 1.49700 | 81.5 |
| 8 | 23.079 | 0.20 | | |
| 9 | 22.235 | 5.09 | 1.65320 | 33.2 |
| 10 | −83.621 | (Variable) | | |
| 11 (Diaphragm) | ∞ | 1.23 | | |
| 12 | 18.738 | 1.00 | 1.98612 | 16.5 |
| 13 | 13.892 | 6.96 | 1.59061 | 62.5 |
| 14 | −12.577 | 1.00 | 1.90043 | 37.4 |
| 15 | 23.254 | 4.18 | 1.80810 | 22.8 |
| 16 | −23.916 | (Variable) | | |
| 17 | 15.935 | 1.20 | 2.05090 | 26.9 |
| 18 | 12.035 | 8.85 | 1.49700 | 81.5 |
| 19 | −114.197 | 0.15 | | |
| 20 | 30.900 | 1.20 | 1.95375 | 32.3 |
| 21 | 12.473 | 8.19 | 1.43875 | 94.7 |
| 22 | −29.081 | (Variable) | | |
| 23 | −16.893 | 1.00 | 1.72916 | 54.7 |
| 24 | −25.855 | (Variable) | | |
| 25* | −26.052 | 1.50 | 1.77250 | 49.6 |
| 26 | −45.917 | (Variable) | | |
| Image Plane | ∞ | | | |

ASPHERICAL SURFACE DATA

1st Surface

K = 0.00000e+000 A 4 = 1.24565e−005 A 6 = 5.68163e−008
A 8 = −2.01033e−010 A10 = 3.35836e−013 A12 = −2.74725e−016
A14 = 9.91063e−020

2nd Surface

K = −2.52394e+000 A 4 = 1.78595e−005 A 6 = 2.50128e−008
A 8 = 6.71921e−010 A10 = −3.64716e−012 A12 = 7.84554e−015
A14 = −5.37660e−018

25th Surface

K = 0.00000e+000 A 4 = −4.43508e−005 A 6 = −2.47613e−007
A 8 = 1.39096e−009 A10 = −1.53227e−011 A12 = 3.30746e−014

VARIOUS DATA
Zoom Ratio 1.74

| | Wide Angle | Middle | Telephoto |
|---|---|---|---|
| Focal Length: | 10.01 | 13.19 | 17.46 |
| F-NUMBER: | 4.12 | 4.12 | 4.12 |
| Half Angle of View (°): | 62.21 | 56.59 | 51.10 |
| Image Height: | 19.00 | 20.00 | 21.64 |
| Overall Lens Length: | 106.74 | 102.63 | 99.55 |
| BF: | 12.36 | 12.36 | 12.36 |
| d10 | 17.19 | 8.71 | 1.26 |
| d16 | 4.12 | 4.25 | 3.59 |
| d22 | 2.25 | 2.05 | 4.03 |
| d24 | 1.87 | 6.30 | 9.35 |
| d26 | 12.36 | 12.36 | 12.36 |

ZOOM LENS UNIT DATA

| Unit | Starting Surface | Focal Length |
|---|---|---|
| 1 | 1 | −13.96 |
| 2 | 11 | 34.11 |
| 3 | 17 | 35.12 |
| 4 | 23 | −70.13 |
| 5 | 25 | −80.61 |

Various values in each numerical example are summarized in Table 1 below.

TABLE 1

| Inequality | Ex. 1 | Ex. 2 | Ex. 3 | Ex. 4 | Ex. 5 |
|---|---|---|---|---|---|
| Inequality (1) | 1.342 | −0.626 | 0.824 | 0.943 | 1.079 |
| Inequality (2) | −0.400 | −0.135 | −0.510 | −0.953 | −0.178 |
| Inequality (3) | 2.091 | 2.309 | 1.658 | 2.105 | 2.629 |
| Inequality (4) | −5.962 | −9.752 | −6.937 | −8.053 | −7.005 |
| Inequality (5) | 4.018 | 4.073 | 4.245 | 4.050 | 3.771 |
| Inequality (6) | −4.265 | −4.107 | −4.019 | −4.018 | −4.312 |
| Inequality (7) | 1.457 | 3.179 | −3.278 | 2.771 | 3.623 |
| Inequality (8) | −1.200 | −1.096 | −1.207 | −1.183 | −1.250 |
| Inequality (9) | 0.162 | 0.162 | 0.129 | 0.150 | 0.100 |
| Inequality (10) | 5.773 | 5.617 | 5.631 | 5.776 | 5.703 |
| TD1 | 32.855 | 30.027 | 27.706 | 33.489 | 32.499 |
| f1 | −14.549 | −15.921 | −14.456 | −14.757 | −13.962 |
| fr | −55.292 | −90.492 | −64.451 | −80.584 | −70.133 |
| rnf | 10.997 | 11.251 | 11.026 | 9.538 | 9.261 |
| mr | 7.288 | 9.996 | 6.291 | 0.000 | 7.479 |
| fw | 9.274 | 9.280 | 9.291 | 10.006 | 10.012 |
| skw | 15.713 | 13.005 | 16.709 | 15.913 | 12.363 |
| POw | 37.261 | 37.795 | 39.438 | 40.529 | 37.750 |
| fave | −39.556 | −38.109 | −37.342 | −40.204 | −43.167 |
| R1 | −44.874 | −42.509 | 55.339 | −37.104 | −26.052 |
| R2 | −241.108 | −81.533 | 29.465 | −79.002 | −45.917 |
| ft | 17.459 | 17.455 | 17.451 | 17.458 | 17.456 |
| TDr | 1.500 | 1.500 | 1.200 | 1.500 | 1.000 |
| TTDt | 100.796 | 98.055 | 98.265 | 100.830 | 99.547 |
| ft | 17.459 | 17.455 | 17.451 | 17.458 | 17.456 |

According to each example, it is possible to acquire a small and light zoom lens having a wide angle of view and having high optical performance over an entire zoom range.

Image Pickup Apparatus

Figure 11:
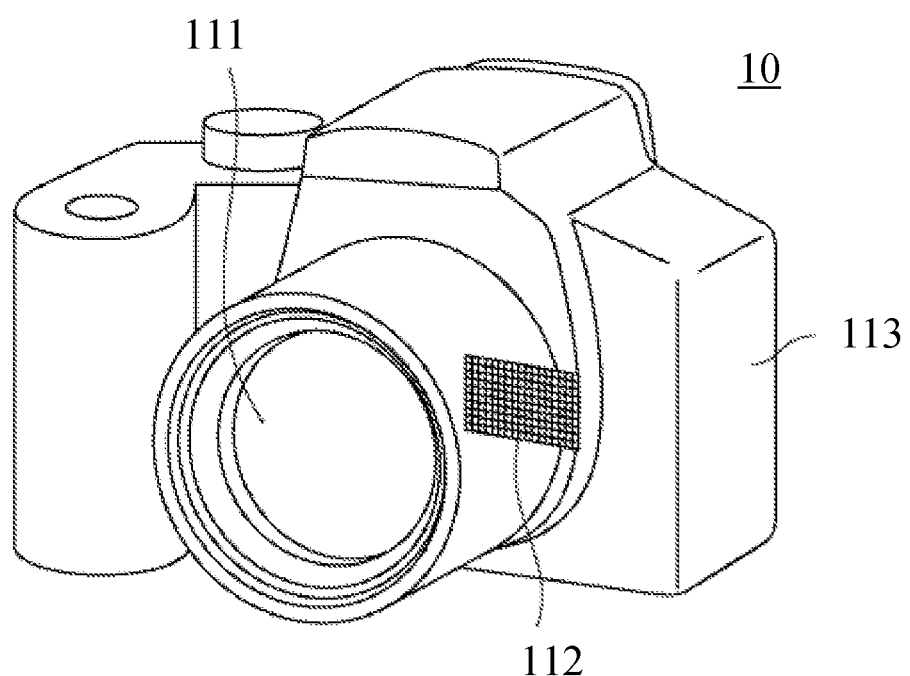
FIG. 11 is a schematic view of an image pickup apparatus having a zoom lens according to each example.

Next, with reference to FIG. 11, a description is given of an embodiment of a digital still camera (image pickup apparatus) 10 that uses any of the zoom lenses 1a to 1e according to the respective examples as an image pickup optical system. FIG. 11 is a schematic diagram of the image pickup apparatus 10 including any of the zoom lenses 1a to 1e according to the respective examples.

In FIG. 11, a reference numeral 113 denotes a camera main body, and a reference numeral 111 denotes an image pickup optical system including any of the zoom lenses according to Examples 1 to 5. A reference numeral 112 denotes an image sensor (photoelectric conversion element), such as a CCD sensor and a CMOS sensor, that is built in the camera body 113 and receives and photoelectrically converts an optical image formed by the image pickup optical system 111. The camera body 113 may be a so-called single-lens reflex camera having a quick turn mirror, or a so-called mirrorless camera not having a quick turn mirror.

By applying any of the zoom lenses 1a to 1e according to the respective examples to an image pickup apparatus such as a digital still camera in this way, it is possible to provide an image pickup apparatus having a small and light zoom lens having a wide-angle of view and having high optical performance over the entire zoom range.

Image Pickup System

An image pickup system (surveillance camera system) may be configured that includes the zoom lens according to each example and a controlling unit configured to control the zoom lens. In this case, the controlling unit can control the zoom lens so that each lens unit moves as described above during zooming and focusing. The controlling unit may not be configured integrally with the zoom lens and may be configured separately from the zoom lens. For example, a configuration may be such that the controlling unit (control apparatus) placed away from a driving unit for driving each lens of the zoom lens includes a transmitting unit that transmits a control signal (instruction) for controlling the zoom lens. By using such a controlling unit, the zoom lens can be remotely controlled.

Further, the configuration may be such that the controlling unit includes an operation unit such as a controller and a button for remotely operating the zoom lens and thereby the zoom lens is controlled according to input by a user to the operation unit. For example, an enlargement button and a reduction button are provided as the operation unit. In this case, the configuration may be such that a signal is transmitted from the controlling unit to the driving unit of the zoom lens so that when the user presses the enlargement button, the magnification of the zoom lens increases, and when the user presses the reduction button, the magnification of the zoom lens decreases.

The image pickup system may include a display unit such as a liquid crystal panel that displays information on zooming (moving state) of the zoom lens. The information on zooming of the zoom lens is, for example, a zooming magnification (zooming state) or a moving amount (moving state) of each lens unit. In this case, the user can remotely operate the zoom lens via the operation unit while viewing the information on zooming of the zoom lens displayed on the display unit. In this case, the display unit and the operation unit may be integrally configured by adopting, for example, a touch panel.

According to the above-described embodiments, it is possible to provide a small and light zoom lens having a wide angle of view and good optical performance over an entire zoom range and an image pickup apparatus having the zoom lens.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-000016, filed on Jan. 1, 2022, which is hereby incorporated by reference herein in its entirety.

What is claimed is:

1. A zoom lens comprising a plurality of lens units, the plurality of lens units consisting of, in order from an object side to an image side, a first lens unit having a negative refractive power, a middle group including one or more lens units, and a final lens unit having a negative refractive power, wherein each distance between adjacent lens units changes during zooming,
wherein the first lens unit includes at least three negative lenses, and wherein following inequalities are satisfied:

$$0.6 < TD1^2/(fl \times fr) < 10.0$$

$$-10.0 < (mr-mf)/fw < -0.1$$

$$1.0 < (R2+R1)/(R2-R1) < 10.0$$

$$0.05 < TDr/fw < 0.50$$

where TD1 represents a thickness on an optical axis of the first lens unit, fl represents a focal length of the first lens unit, fr represents a focal length of the final lens unit, mr represents a moving amount of the final lens unit during zooming from a wide-angle end to a telephoto end, mf represents a moving amount of a lens unit next to the final lens unit on the object side during zooming from the wide-angle end to the telephoto end, fw represents a focal length of the zoom lens at the wide-angle end, R1 represents a curvature radius of an object-side lens surface of a lens closest to an image in the final lens unit, R2 represents a curvature radius of an image-side lens surface of the lens closest to the image in the final lens unit, and TDr represents a thickness on an optical axis of the final lens unit.

2. The zoom lens according to claim 1, wherein a following inequality is satisfied:

$$0.5 < TD1/skw < 5.0$$

where skw represents a back focus of the zoom lens at the wide-angle end.

3. The zoom lens according to claim 1, wherein the zoom lens satisfies a following inequality:

$$-12.0 < fr/fw < -2.0.$$

4. The zoom lens according to claim 1, wherein a following inequality is satisfied:

$$2.0 < POw/fw < 10.0$$

where POw represents a distance from an image plane to an exit pupil position of the zoom lens at the wide-angle end.

5. The zoom lens according to claim 1, wherein a following inequality is satisfied:

$$-8.0 < fave/fw < -2.$$

where fave represents an average focal length of the at least three negative lenses of the first lens unit.

6. The zoom lens according to claim 1, wherein the final lens unit consists of a single lens having a negative refractive power.

7. The zoom lens according to claim 1, wherein a following inequality is satisfied:

$$-3.0 < ft/fl < -0.5$$

where ft represents a focal length of the zoom lens at the telephoto end.

8. The zoom lens according to claim 1, wherein a following inequality is satisfied:

$$2.0 < TTDt/ft < 10.0$$

where TTDt represents an overall lens length of the zoom lens at the telephoto end.

9. The zoom lens according to claim 1, wherein the at least three negative lenses are consecutively arranged from the object side to the image side.

10. The zoom lens according to claim 1, wherein the final lens unit includes an aspherical surface.

11. The zoom lens according to claim 1, wherein the plurality of lens units consist of four lens units having negative, positive, positive, and negative refractive powers in order from the object side to the image side.

12. The zoom lens according to claim 1, wherein the plurality of lens units consist of three lens units having negative, positive, and negative refractive powers in order from the object side to the image side.

13. The zoom lens according to claim 1, wherein the plurality of lens units consist of five lens units having negative, positive, positive, negative, and negative refractive powers in order from the object side to the image side.

14. An apparatus comprising:
a zoom lens; and
a sensor configured to receive light of an image formed by the zoom lens,
wherein the zoom lens includes a plurality of lens units, the plurality of lens units consisting of, in order from an object side to an image side, a first lens unit having a negative refractive power, a middle group including one or more lens units, and a final lens unit having a negative refractive power, wherein each distance between adjacent lens units changes during zooming,
wherein the first lens unit includes at least three negative lenses, and
wherein following inequalities are satisfied:

$$0.6 < TD1^2/(fl \times fr) < 10.0$$

$$-10.0 < (mr-mf)/fw < -0.1$$

$$1.0 < (R2+R1)/(R2-R1) < 10.0$$

$$0.05 < TDr/fw < 0.50$$

where TD1 represents a thickness on an optical axis of the first lens unit, fl represents a focal length of the first lens unit, fr represents a focal length of the final lens unit, mr represents a moving amount of the final lens unit during zooming from a wide-angle end to a telephoto end, mf represents a moving amount of a lens unit next to the final lens unit on the object side during zooming from the wide-angle end to the telephoto end, fw represents a focal length of the zoom lens at the wide-angle end, R1 represents a curvature radius of an object-side lens surface of a lens closest to an image in the final lens unit, R2 represents a curvature radius of an image-side lens surface of the lens closest to the image in the final lens unit, and TDr represents a thickness on an optical axis of the final lens unit.

15. A system comprising:
a zoom lens; and
at least one processor configured to execute a plurality of tasks including a controlling task configured to control the zoom lens during zooming,
of lens units consisting of, in order from an object side to an image side, a first lens unit having a negative refractive power, a middle group including one or more lens units, and a final lens unit having a negative refractive power, wherein each distance between adjacent lens units changes during zooming,
wherein the first lens unit includes at least three negative lenses, and
wherein following inequalities are satisfied:

$$0.6 < TD1^2/(fl \times fr) < 10.0$$

$$-10.0 < (mr-mf)/fw < -0.1$$

$$1.0 < (R2+R1)/(R2-R1) < 10.0$$

$$0.05 < TDr/fw < 0.50$$

where TD1 represents a thickness on an optical axis of the first lens unit, fl represents a focal length of the first lens unit, fr represents a focal length of the final lens unit, mr represents a moving amount of the final lens unit during zooming from a wide-angle end to a telephoto end, mf represents a moving amount of a lens unit next to the final lens unit on the object side during zooming from the wide-angle end to the telephoto end, fw represents a focal length of the zoom lens at the wide-angle end, R1 represents a curvature radius of an object-side lens surface of a lens closest to an image in the final lens unit, R2 represents a curvature radius of an image-side lens surface of the lens closest to the image in the final lens unit, and TDr represents a thickness on an optical axis of the final lens unit.

16. The system according to claim 15, wherein the at least one processor is included in a separate body separate from the zoom lens, and
wherein the separate body includes a transmitting unit configured to transmit a control signal for controlling the zoom lens.

17. The system according to claim 15, wherein the at least one processor is included in a separate body separate from the zoom lens, and
wherein the separate body includes an operation unit for operating the zoom lens.

18. The system according to claim 15, comprising a display unit configured to display information on zooming of the zoom lens.

19. A zoom lens comprising a plurality of lens units, the plurality of lens units consisting of, in order from an object side to an image side, a first lens unit having a negative refractive power, a middle group including one or more lens units, and a final lens unit having a negative refractive power, wherein each distance between adjacent lens units changes during zooming,
wherein the first lens unit includes at least three negative lenses,
wherein the final lens unit consists of a single lens having a negative refractive power, and
wherein following inequalities are satisfied:

$$0.6 < TD1^2/(fl \times fr) < 10.0$$

$$-10.0 < (mr-mf)/fw < -0.1$$

$$1.0 < (R2+R1)/(R2-R1) < 10.0$$

where TD1 represents a thickness on an optical axis of the first lens unit, fl represents a focal length of the first lens unit, fr represents a focal length of the final lens unit, mr represents a moving amount of the final lens unit during zooming from a wide-angle end to a telephoto end, mf represents a moving amount of a lens unit next to the final lens unit on the object side during zooming from the wide-angle end to the telephoto end, fw represents a focal length of the zoom lens at the wide-angle end, R1 represents a curvature radius of an object-side lens surface of a lens closest to an image in the final lens unit, and R2 represents a curvature radius of an image-side lens surface of the lens closest to the image in the final lens unit.

20. A zoom lens comprising a plurality of lens units, the plurality of lens units consisting of, in order from an object side to an image side, a first lens unit having a negative refractive power, a second lens unit having a positive refractive power, a third lens unit having a positive refractive power, and a final lens unit having a negative refractive power, wherein each distance between adjacent lens units changes during zooming,
wherein the first lens unit includes at least three negative lenses, and
wherein following inequalities are satisfied:

$$0.6 < TD1^2/(fl \times fr) < 10.0$$

$$-10.0 < (mr-mf)/fw < -0.1$$

$$1.0 < (R2+R1)/(R2-R1) < 10.0$$

where TD1 represents a thickness on an optical axis of the first lens unit, fl represents a focal length of the first lens unit, fr represents a focal length of the final lens unit, mr represents a moving amount of the final lens unit during zooming from a wide-angle end to a telephoto end, mf represents a moving amount of the third lens unit next to the final lens unit on the object side during zooming from the wide-angle end to the telephoto end, fw represents a focal length of the zoom lens at the wide-angle end, R1 represents a curvature radius of an object-side lens surface of a lens closest to an image in the final lens unit, and R2 represents a curvature radius of an image-side lens surface of the lens closest to the image in the final lens unit.

21. A zoom lens comprising a plurality of lens units, the plurality of lens units consisting of, in order from an object side to an image side, a first lens unit having a negative refractive power, a second lens unit having a positive refractive power, and a final lens unit having a negative refractive power, wherein each distance between adjacent lens units changes during zooming,
wherein the first lens unit includes at least three negative lenses, and
wherein following inequalities are satisfied:

$0.6 < TD1^2/(fl \times fr) < 10.0$ $-10.0 < (mr-mf)/fw < -0.1$ $1.0 < (R2+R1)/(R2-R1) < 10.0$ where TD1 represents a thickness on an optical axis of the first lens unit, fl represents a focal length of the first lens unit, fr represents a focal length of the final lens unit, mr represents a moving amount of the final lens unit during zooming from a wide-angle end to a telephoto end, mf represents a moving amount of the second lens unit next to the final lens unit on the object side during zooming from the wide-angle end to the telephoto end, fw represents a focal length of the zoom lens at the wide-angle end, R1 represents a curvature radius of an object-side lens surface of a lens closest to an image in the final lens unit, and R2 represents a curvature radius of an image-side lens surface of the lens closest to the image in the final lens unit.

22. A zoom lens comprising a plurality of lens units, the plurality of lens units consisting of, in order from an object side to an image side, a first lens unit having a negative refractive power, a second lens unit having a positive refractive power, a third lens unit having a positive refractive power, a fourth lens unit having a negative refractive power, and a final lens unit having a negative refractive power, wherein each distance between adjacent lens units changes during zooming,
wherein the first lens unit includes at least three negative lenses, and
wherein following inequalities are satisfied:

$0.6 < TD1^2/(fl \times fr) < 10.0$ $-10.0 < (mr-mf)/fw < -0.1$ $1.0 < (R2+R1)/(R2-R1) < 10.0$ where TD1 represents a thickness on an optical axis of the first lens unit, fl represents a focal length of the first lens unit, fr represents a focal length of the final lens unit, mr represents a moving amount of the final lens unit during zooming from a wide-angle end to a telephoto end, mf represents a moving amount of the fourth lens unit next to the final lens unit on the object side during zooming from the wide-angle end to the telephoto end, fw represents a focal length of the zoom lens at the wide-angle end, R1 represents a curvature radius of an object-side lens surface of a lens closest to an image in the final lens unit, and R2 represents a curvature radius of an image-side lens surface of the lens closest to the image in the final lens unit.

* * * * *